United States Patent
Ichikawa et al.

(10) Patent No.: US 6,543,548 B1
(45) Date of Patent: Apr. 8, 2003

(54) VEHICLE OPERATING DEVICE USING STEERING ANGLE AND VEHICLE SPEED TO CONTROL PAIR OF CONTINUOUSLY VARIABLE TRANSMISSIONS

(75) Inventors: Katsuhisa Ichikawa, Wako (JP); Masakatsu Kono, Wako (JP); Kazunari Iriki, Wako (JP); Tsuyoshi Kawabata, Wako (JP); Kenji Kuroiwa, Wako (JP); Tsutomu Inui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/443,173

(22) Filed: May 17, 1995

(30) Foreign Application Priority Data

Apr. 20, 1995 (JP) .............................................. 7-095606
May 17, 1995 (JP) .............................................. 6-103127

(51) Int. Cl.$^7$ ............................................... A01B 33/00
(52) U.S. Cl. ......................................... 172/49; 180/248
(58) Field of Search .............................. 172/35, 48, 49; 180/197, 248, 233, 247; 364/424.1, 424.07

(56) References Cited

U.S. PATENT DOCUMENTS

| | | | | |
|---|---|---|---|---|
| 4,293,050 A | * | 10/1981 | Goloff et al. ............... | 180/6.26 |
| 4,399,886 A | * | 8/1983 | Pollman ................. | 180/6.48 X |
| 4,519,275 A | * | 5/1985 | Maruyama et al. ........... | 74/866 |
| 4,527,649 A | * | 7/1985 | Mauldin ..................... | 180/6.48 |
| 4,549,610 A | * | 10/1985 | Van Der Lely ................ | 172/3 |
| 4,553,620 A | * | 11/1985 | Eckhardt et al. ............ | 180/6.48 |
| 4,561,513 A | * | 12/1985 | Barbagli et al. ........... | 180/6.48 |
| 4,599,855 A | * | 7/1986 | Seelman ................. | 180/6.48 X |
| 4,631,920 A | * | 12/1986 | Seelman ................. | 180/6.48 X |
| 4,718,299 A | * | 1/1988 | Greenwood ................... | 74/691 |
| 4,837,694 A | * | 6/1989 | Narita et al. ........... | 180/6.48 X |
| 4,914,592 A | * | 4/1990 | Callahan et al. ........ | 180/6.48 X |
| 5,078,222 A | * | 1/1992 | Hauser et al. ............. | 180/6.48 |
| RE34,057 E | | 9/1992 | Middlesworth | |
| 5,178,229 A | * | 1/1993 | Strenzke ..................... | 180/6.48 |
| 5,247,784 A | * | 9/1993 | Kitamura et al. ....... | 180/6.48 X |
| 5,258,912 A | * | 11/1993 | Ghoneim et al. ....... | 180/6.48 X |
| 5,259,470 A | * | 11/1993 | Akahane et al. ........ | 180/6.48 X |
| 5,303,796 A | * | 4/1994 | Tanaka et al. ............... | 180/233 |
| 5,337,630 A | * | 8/1994 | Sakai et al. .................. | 477/131 |
| 5,515,275 A | * | 5/1996 | Ackermann ............. | 180/197 X |

FOREIGN PATENT DOCUMENTS

| | | |
|---|---|---|
| FR | 1 573 169 | 7/1969 |
| FR | 2 418 136 | 9/1979 |
| JP | 40-31219 | 11/1965 |
| JP | 49-38826 | 10/1974 |
| JP | 57-950 | 1/1982 |
| JP | 57-25428 | 5/1982 |

OTHER PUBLICATIONS

WO93/08063, Apr. 29, 1993, PCT/DE92/00859.

* cited by examiner

*Primary Examiner*—Victor Batson
(74) *Attorney, Agent, or Firm*—Arent Fox Kintner Plotkin & Kahn, PLLC

(57) ABSTRACT

A working vehicle 1 includes front wheels Wf steered by a steering wheel 8, and rear wheels Wr driven through a transmission system T incorporating static hydraulic pressure type continuously variable transmissions. A speed change operating device M for controlling speed change of the transmission system T accelerates or decelerates right and left rear wheels Wr at same rotating speed by operation of a change lever 10, and also generates a difference in rotating speed between the right and left rear wheels Wr by operation of the steering wheel 8. The steering characteristic on the basis of operation of the steering wheel 8 varies depending on the vehicle speed set by the change lever 10, so that an appropriate steering characteristic may be obtained if the vehicle speed is changed.

13 Claims, 27 Drawing Sheets

VEHICLE OPERATING DEVICE USING STEERING ANGLE AND VEHICLE SPEED TO CONTROL PAIR OF CONTINUOUSLY VARIABLE TRANSMISSIONS

BACKGROUND OF THE INVENTION

1. Field of the Invention

The present invention relates to an operating device in a vehicle provided with a pair of continuously variable transmissions, comprising a pair of right and left continuously variable transmissions such as hydrostatic continuously variable transmissions, belt-type continuously variable transmissions, cone-type continuously variable transmissions, and frictional-type continuously variable transmissions, for controlling the vehicle speed and conducting a steering by connecting the right and left continuously variable transmissions to right and left driven wheels, respectively.

2. Description of the Prior Art

Such a steering control device in a vehicle provided with a pair of continuously variable transmissions has already been disclosed in Japanese Patent Publication No. 57-25428, Japanese Utility Model Publication No. 49-38826, Japanese Patent Application Laid-open No. 57-950, and Japanese Utility Model Publication No. 40-31219.

Steering characteristics at the time of turning of a vehicle include, among others, a neutral steering state in which the speed of an inner wheel of the driven wheels during turning and the speed of an outer wheel of the driven wheels during turning have a predetermined ratio relative to each other that is suited to the turning radius so that a slipping tendency does not occur in either of inner and outer wheels, an under-steering state in which the speed of the inner wheel has a higher ratio to the outer wheel speed than that in the neutral steering state, an over-steering state in which the outer wheel speed has a higher ratio to the inner wheel speed than that in the neutral steering state, and a stationary turning state in which the inner wheel speed during turning is zero.

In the mentioned known operating devices, however, the steering characteristics that are set on the basis of the operation of the steering angle setting means can not be varied, and thus a favorable steering characteristic cannot always be obtained following changes in the vehicle speed.

Further, in the known operating devices, the operation of vehicle speed setting means and the operation of steering angle setting means are mixed in a speed change operating device, and transmitted to the transmission and therefore, if the operation of vehicle speed setting means interferes with the operation of steering angle setting means, or the operation of steering angle setting means interferes with the operation of vehicle speed setting means, there is a problem that the vehicle traveling operation becomes complicated, or the travel operation feeling is impaired.

Furthermore, in the known operating devices, unless the speed change operating device and transmission are configured and located rationally, not only the balance of weight distribution and space distribution in the lateral direction of the vehicle body is worsened, but also a link mechanism for transmitting the motion of a speed change control member of the speed change operating device to a speed change control member of the transmission is complicated and extended in length, and accurate speed change control may become difficult because a deflection or backlash is produced.

It is a first object of the invention to always obtain a favorable steering characteristic regardless of vehicle speed changes.

It is a second object of the invention to reliably operate the speed change operating device, while avoiding interference between the operation of vehicle speed setting means and operation of steering angle setting means.

Further, it is a third object of the invention to realize an accurate speed change control by rationally disposing the speed change operating device and transmission in a vehicle provided with a pair of continuously variable transmissions, thereby improving the balance in the lateral direction of the vehicle body and designing the link mechanism in a compact form.

To achieve the first object, the invention provides an operating device in a vehicle provided with a pair of continuously variable transmissions, the vehicle comprising: left and right driven wheels connected to the pair of continuously variable transmissions, respectively; a vehicle speed setting means for setting a vehicle speed; and a steering angle setting means for setting a steering angle; in which outputs of the continuously variable transmissions are increased and decreased at substantially identical rotational numbers to each other based on an operation of the vehicle speed setting means, and the outputs of the continuously variable transmissions are increased and decreased at different rotational numbers from each other based on an operation of the steering angle setting means, thereby varying wheel speeds of the driven wheels so as to control the vehicle speed and to conduct a steering, wherein the operating device includes a steering characteristic changeover means for changing over speed increasing and decreasing characteristics of the pair of continuously variable transmissions based on the operation of the steering angle setting means in accordance with the vehicle speed.

According to the above arrangement, since the steering characteristic changeover means changes over the acceleration and deceleration characteristics of the pair of continuously variable transmissions which are based on the operation of the steering angle setting means, depending on the vehicle speed, a favorable steering characteristic suited to the vehicle speed is obtained both at low vehicle speed and at high vehicle speed. Once the vehicle speed is set by the vehicle speed setting means, the turning speed and turning radius can be set to an ideal state by operation of the steering angle setting means, and therefore it is possible not only to achieve a stable turning radius with a small slip rate of the inner and outer wheels with respect to the ground but also to facilitate the vehicle travel operation, thus enhancing the working efficiency and lessening the fatigue of the driver.

To achieve the second object, the invention provides an operating device which includes the above arrangement, and further comprises: a transmission system including the pair of continuously variable transmissions for changing the rotational numbers of the left and right driven wheels; and a pair of speed change follower members provided in the transmission system wherein a speed change operating device is provided for driving the speed change follower members at an identical phase based-on an operation of the vehicle speed setting means, and for driving the speed change follower members at different phases based on an operation of the steering angle setting means; wherein the speed change operating device comprises: a pair of speed change driving members connected to the pair of speed change follower members; a pair of first speed change operating members which are pivotally supported, through a longitudinal shaft, on a lateral shaft which is operatively associated with the operation of the vehicle speed setting means for longitudinal swinging movement, the first speed change operating members being capable of longitudinally swinging integrally with the lateral shaft and capable of laterally swinging about the longitudinal shaft; a link member for connecting the pair of first speed change operating members to the pair of speed change driving members; a second speed change operating member operatively associated with the operation of the steering angle setting means for laterally swinging movement; and a mixing member which transmits a lateral swinging movement of the second speed change operating member to the first speed change operating members for laterally swinging the first speed change operating members, and which restrains a longitudinal swinging movement of the first speed change operating members from being transmitted to the second speed change operating member.

With this arrangement, even if the first speed change operating member is swung longitudinally about the lateral shaft by the operation of the vehicle speed setting means, the longitudinal oscillation of the first speed change operating member is prevented from being transmitted to the steering angle setting means by the mixing member. Moreover, even if the second speed change operating member is swung laterally by the operation of the steering angle setting means, it merely causes the first speed change operating member to oscillate laterally about the longitudinal shaft through the mixing member, so that its lateral oscillation may not be transmitted to the speed change setting means. It is hence possible to transmit the operation of the vehicle speed setting means and operation of steering angle setting means to the transmission while mixing the operations but avoiding their mutual interference, thereby preventing complication of steering operation and worsening of steering feeling.

To achieve the third object, the invention provides an operating device which includes the above arrangement and further characterized in that a transmission system including the pair of continuously variable transmissions and a speed change operating device for controlling speed change characteristics of the continuously variable transmissions are mounted on a vehicle body frame; wherein a speed change control member provided in the speed change operating device and another speed change control member provided in the transmission system are connected together by a link member wherein the speed change operating device is disposed in a lower portion of a seat provided at a substantially central portion of a vehicle body in both longitudinal and lateral directions, the transmission system is disposed in a rear of the speed change operating device at a position substantially centrally in the lateral direction of the vehicle body, and the link member is disposed substantially along the longitudinal direction of the vehicle body.

According to this arrangement, not only the waste space beneath the seat can be effectively utilized, but also the balance of weight distribution and space distribution in the lateral direction of the vehicle body can be enhanced, and moreover the link member for connecting both the speed change control members can be of a minimum length, so that formation of deflection or backlash can be effectively prevented.

The above and other objects, features and advantages of the invention will become apparent from preferred embodiments taken in conjunction with the accompanying drawings.

BRIEF DESCRIPTION OF THE DRAWINGS

FIGS. 1 to 20 show a first embodiment of the invention; wherein

FIG. 1 is a side view of an entire working vehicle;

FIG. 2 is a view taken along an arrow 2 in FIG. 1;

FIG. 3 is an enlarged view of an essential portion of FIG. 1;

FIG. 4 is an enlarged view of an essential portion of FIG. 1;

FIG. 5 is an enlarged view of an essential portion of FIG. 2;

FIG. 6 is an enlarged view of an essential portion of FIG. 2;

FIG. 7 is an enlarged view of an essential portion of FIG. 4;

FIG. 8 is a sectional view taken along a line 8—8 in FIG. 7;

FIG. 9 is an enlarged view of an essential portion of FIG. 8;

FIG. 10 is an enlarged view of an essential portion of FIG. 8;

FIG. 11 is a sectional view taken along a line 11—11 in FIG. 7;

FIG. 12 is a hydraulic circuit diagram;

FIG. 13 is a magnified sectional view taken along a line 13—13 in FIG. 6;

FIG. 14 is a sectional view taken along a line 14—14 in FIG. 13;

FIG. 15 is a view taken along an arrow 15 in FIG. 13;

FIG. 16 is a sectional view taken along a line 16—16 in FIG. 13;

FIG. 17 is a sectional view taken along a line 17—17 in FIG. 13;

FIG. 18 is a view for explaining the operation;

FIG. 19 is a graph showing the relationship between steering angle and wheel ratio; and FIG. 20 is a graph showing the steering characteristic depending on the steering angle and vehicle speed.

FIG. 21 to FIG. 27 show a second embodiment of the invention; wherein

FIG. 21 is a view corresponding to FIG. 5;

FIG. 22 is a view corresponding to FIG. 6;

FIG. 23 is a graph showing an ideal steering characteristic;

FIG. 24 is a graph showing the relationship between outer wheel ratio coefficient and vehicle speed;

FIG. 25 is a graph showing the wheel speed at vehicle speed ±1.0 km/h;

FIG. 26 is a graph showing the wheel speed at vehicle speed ±2.5 km/h; and

FIG. 27 is a graph showing the wheel speed at vehicle speed ±3.5 km/h.

DESCRIPTION OF THE PREFERRED EMBODIMENTS

Referring now to FIG. 1 to FIG. 20, a first embodiment of the invention is described below.

Figure 1:
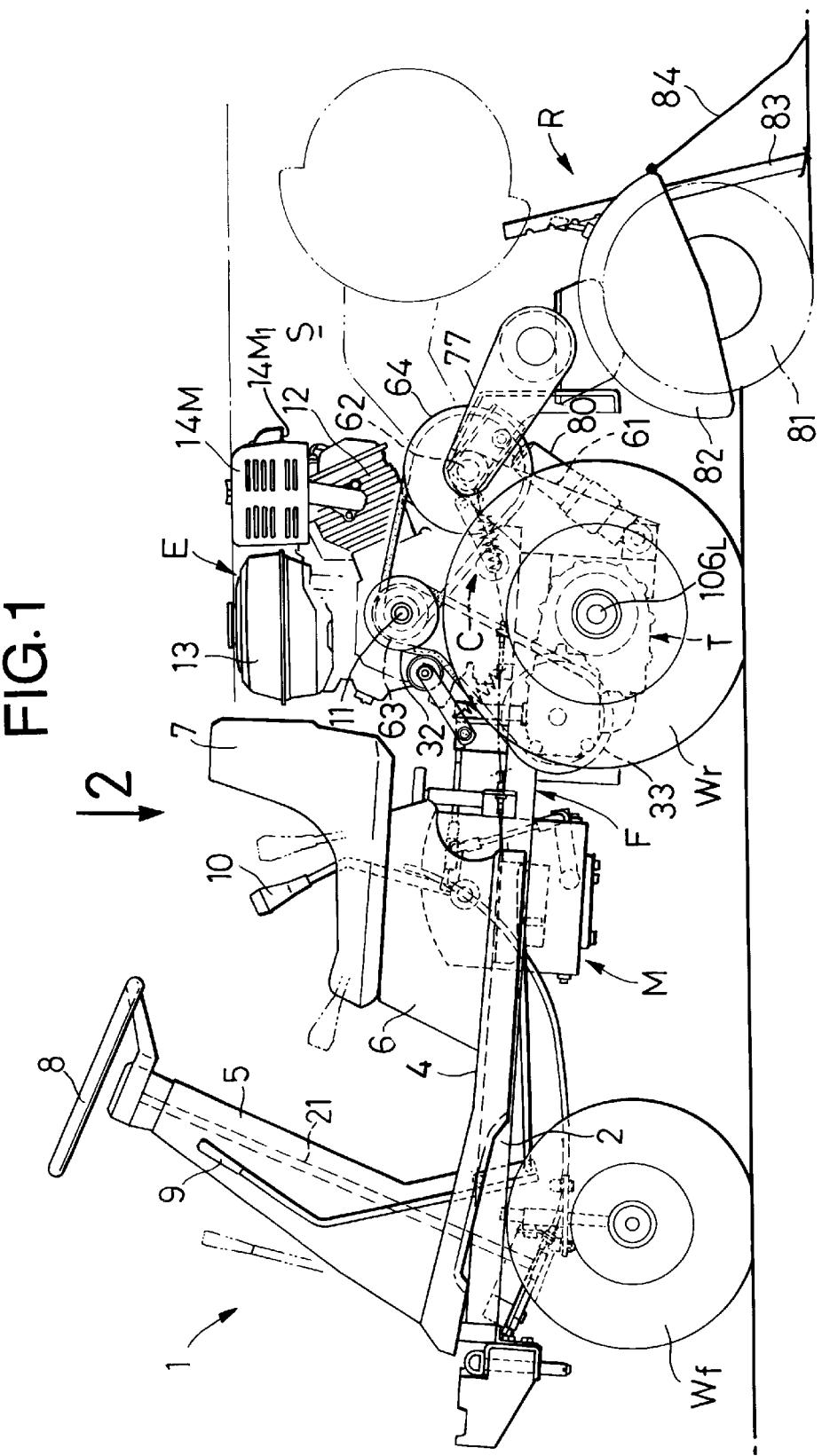
Figure 2:
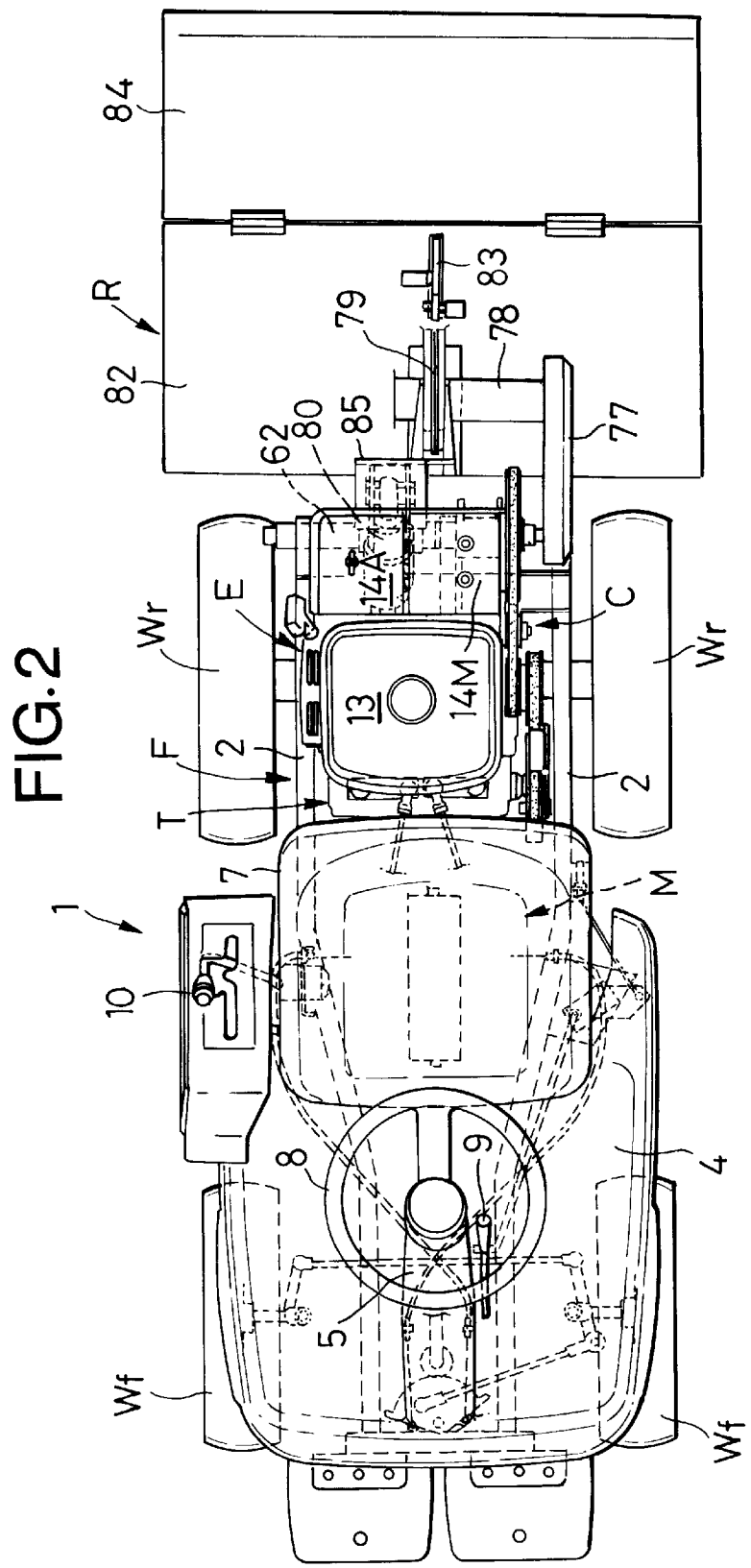

As shown in FIG. 1 and FIG. 2, a riding type working vehicle 1 having a pair of right and left front wheels Wf as follower wheels and a pair of right and left rear wheels Wr as driven wheels has a vehicle body frame F including a pair of right and left side frames 2, 2 extending in the longitudinal direction of the vehicle body, and five cross frames $3_1$ to $3_5$ extending in the lateral direction of the vehicle body for connecting both of the side frames 2, 2. A floor panel 4, a steering wheel post 5, and a seat base 6 are mounted to a front portion of the vehicle body frame F. A seat 7 on which a passenger sits is provided on the seat base 6. The steering wheel post 5 is provided at its upper portion with a steering wheel 8 for steering the right and left front wheels Wf, and generating a difference in rotating speed in the right and left rear wheels Wr through a hydrostatic continuously variable transmission described later. At the left side of the steering wheel post 5, there is provided a clutch lever 9 for turning on or off the tension clutch which controls power transmission to the working machine (which will be described later), and at the right side of the seat 7, a change lever 10 is provided for moving the working vehicle 1 back and forth.

The steering wheel 8 constitutes the steering angle setting means, and the change lever 10 constitutes the vehicle speed setting means of the invention.

A single-cylinder four-cycle engine E is mounted on the upper surface of the rear portion of the vehicle body, such that a crankshaft 11 of the engine E is directed to the lateral direction of the vehicle body, and a cylinder 12 is directed upwardly and rearwardly. On an upper portion of the engine E, a fuel tank 13, an air cleaner 14A, and a muffler 14M are supported. In a lower portion of the engine E, a transmission system T for converting the driving force of the engine E into a hydraulic pressure and driving the right and left rear wheels Wr is mounted. A speed change operating device M installed beneath the seat 7 mixes the operation of the steering wheel 8 and operation of the change lever 10 and transmits to the transmission system T so as to control the rotating speed of the right and left rear wheels Wr independently. A rotary working machine R driven by the engine E is connected to a rear end of the vehicle body.

Figure 3:
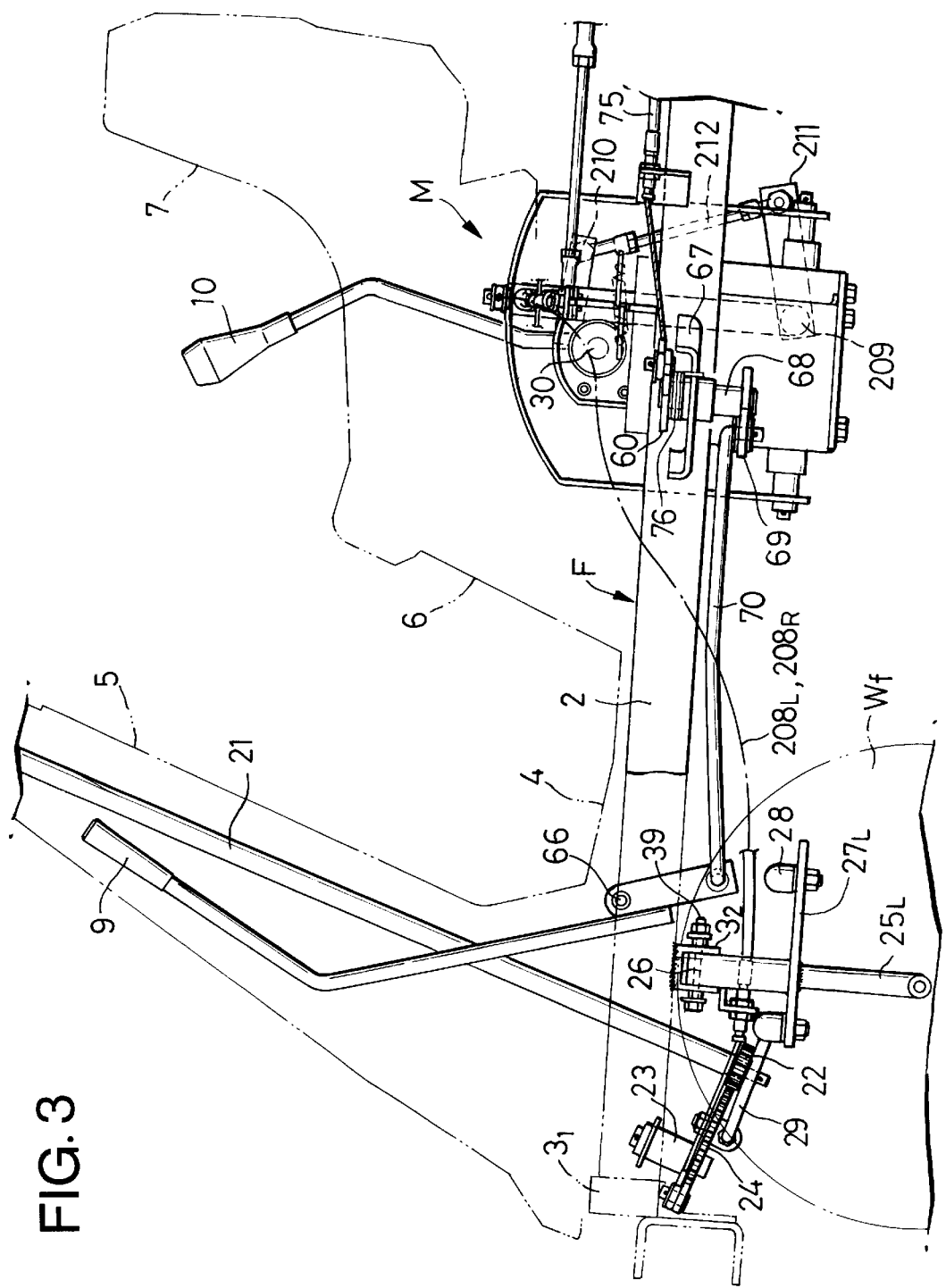
Figure 5:
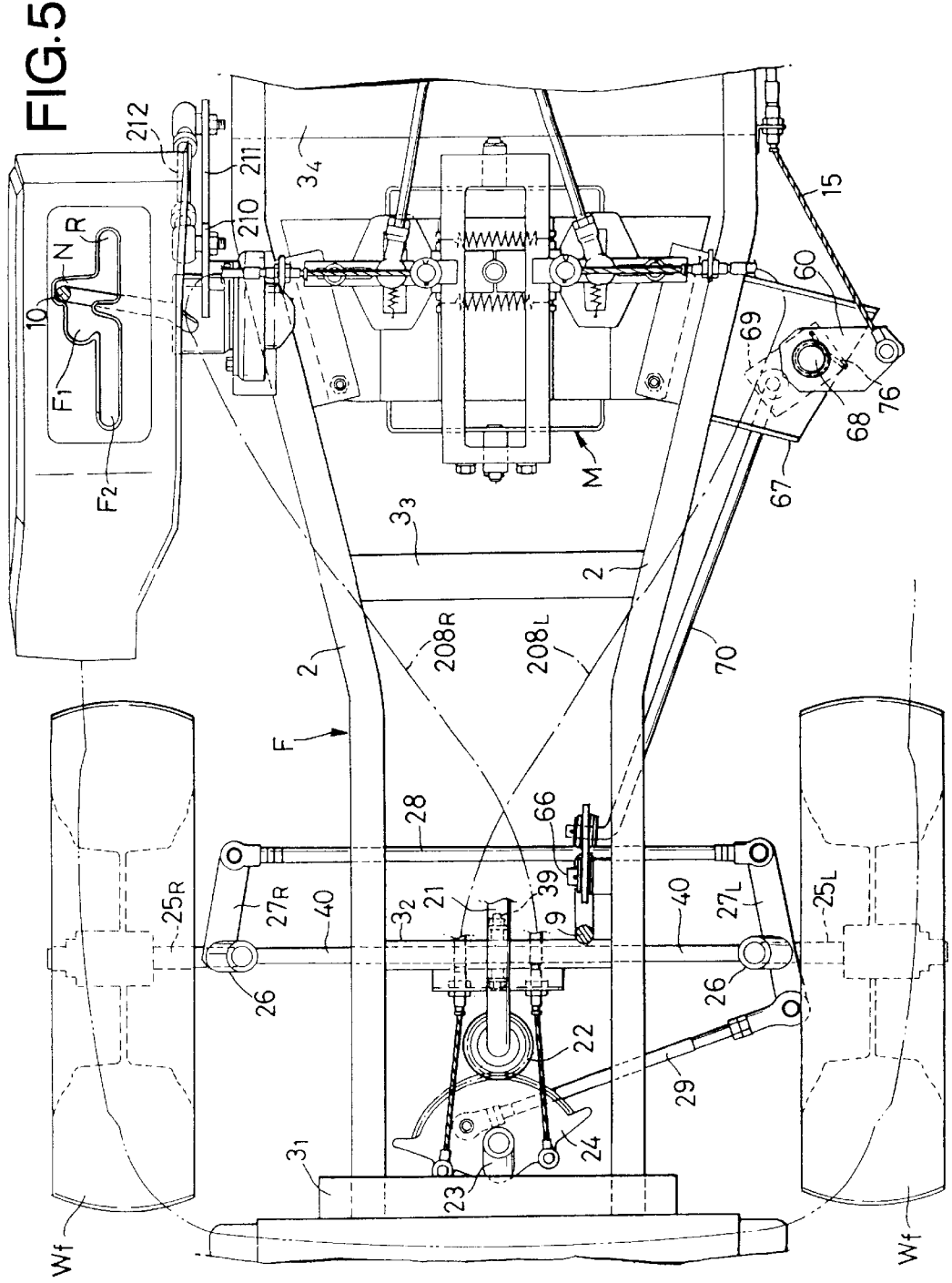

As clear from FIG. 3 and FIG. 5, a gear 22 is secured to the lower end of a steering shaft 21 connected to the steering wheel 8, and a sector gear 24 pivotally supported by a pivot 23 is engaged with the gear 22. Right and left knuckles $25_R$, $25_L$ for pivotally supporting the right and left front wheels Wf are shaped in an L-form, and are supported so as to be free to swivel on guide tubes 26, 26 provided at right and left ends of a plate 40 laterally swingably pivoted on the lower part of the cross frame through a stepped bolt 39. Right and left knuckle arms $27_R$, $27_L$ secured respectively to the knuckles $25_R$, $25_L$ are mutually connected through a tie rod 28, and the left knuckle arm $27_L$ and sector gear 24 are mutually connected through a steering rod 29.

When the steering wheel 8 is operated, the left front wheel Wf is steered through the steering shaft 21, gear 22, sector gear 24, steering rod 29, left knuckle arm $27_L$, and left knuckle $25_L$, and further the right front wheel Wf is steered from the left side knuckle arm $27_L$ through the tie rod 28, right knuckle arm $27_R$ and right knuckle $25_R$. The maximum steering angle of the steering wheel 8 is 200° each clockwise and counterclockwise, and it is set so that the steering angle of the outer front wheel Wf during turning is 50° when the steering angle is 200°.

Figure 4:
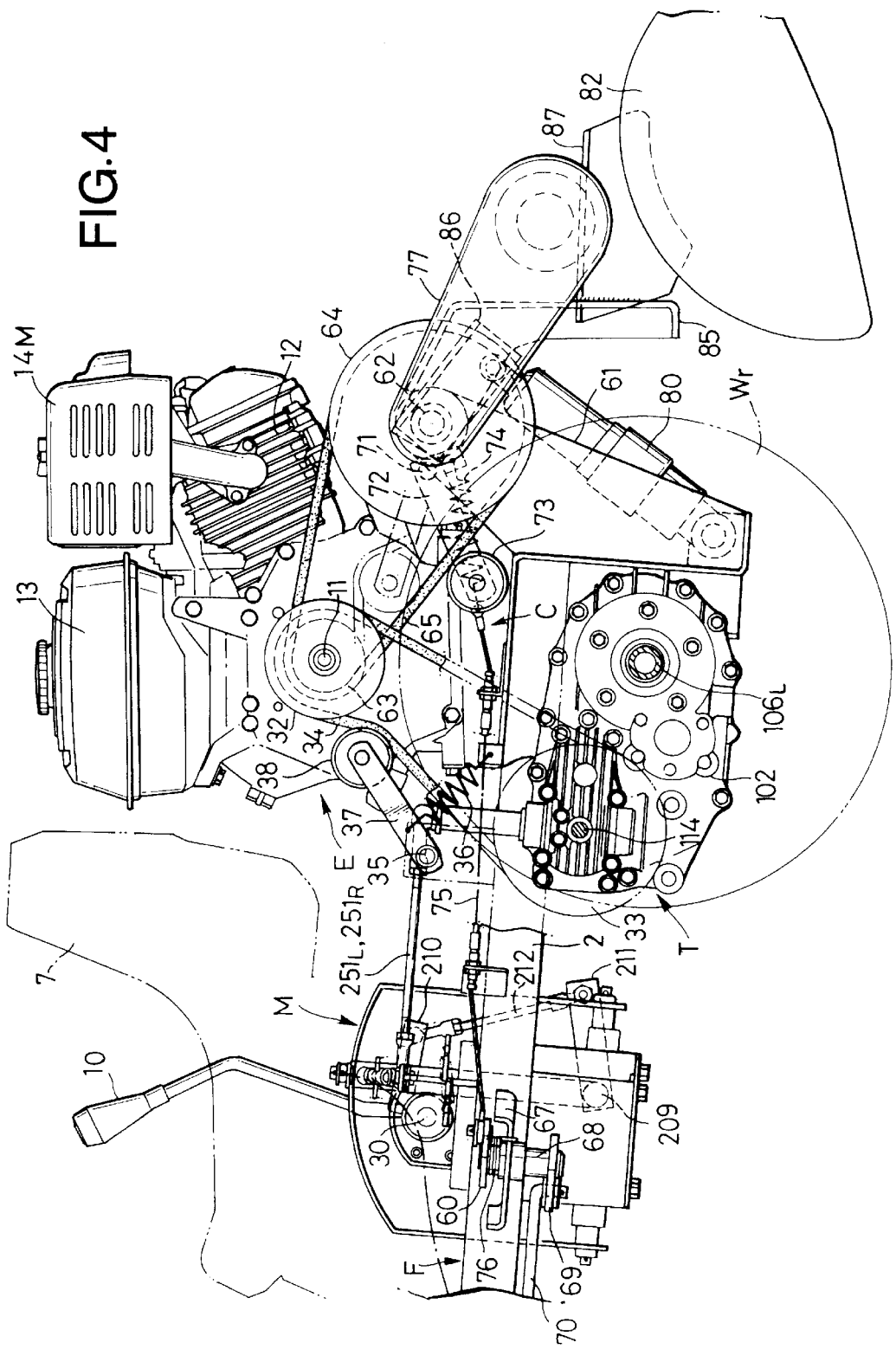
Figure 6:
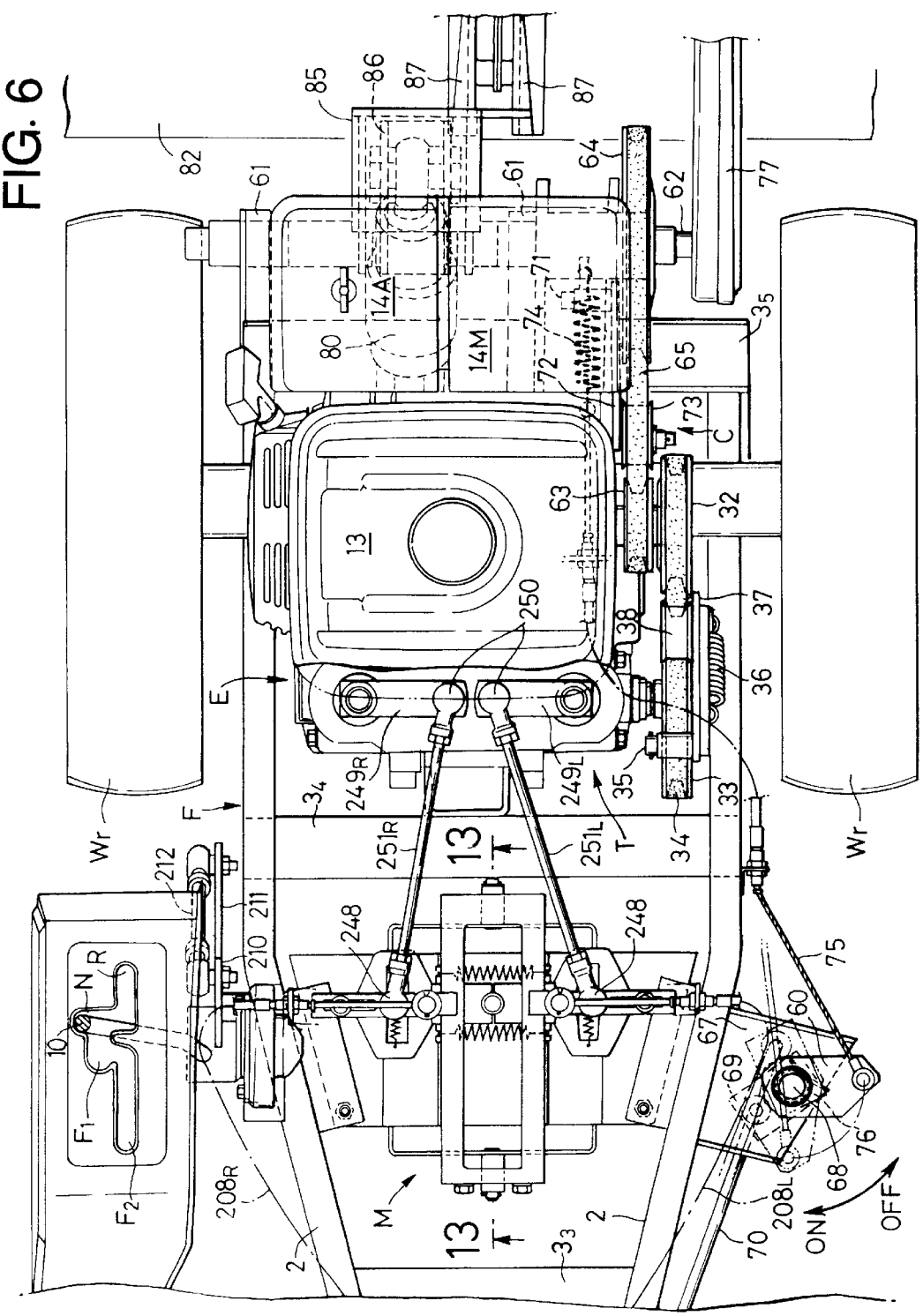

As clear from FIG. 4 and FIG. 6, the change lever 10 is pivoted for swinging movement longitudinally and laterally through a pivot 30 extending in the lateral direction of the vehicle body. When the change lever 10 is at neutral position N, the working vehicle 1 is stopped, and when the change lever 10 is swung forward from the neutral position, the working vehicle 1 begins to run forward at 0 km/h to +7.5 km/h. When the forward swing angle is 14°, the change lever 10 is at the working top position $F_1$, and the vehicle speed is +2.5 km/h. When the forward swing angle is 42°, the change lever 10 is at the traveling top position $F_2$, and the vehicle speed is +7.5 km/h. When the change lever 10 is swung backward from the neutral position, the working vehicle 1 begins to run backward at 0 km/h to −3.5 km/h, and at the backward swing angle of 20°, the change lever 10 is at the reverse top position R, and [the and] the vehicle speed is −3.5 km/h.

The maximum vehicle speed in forward running of +7.5 km/h, and the maximum vehicle speed in reverse running of −3.5 km/h can be changed arbitrarily, and the maximum vehicle speeds in forward running and reverse running may be set, for example, slower than the above values.

Referring then to FIGS. 7 to 12, the structure of the transmission system T for transmitting the driving force of the engine E to the right and left rear wheels Wr is described below.

Figure 7:
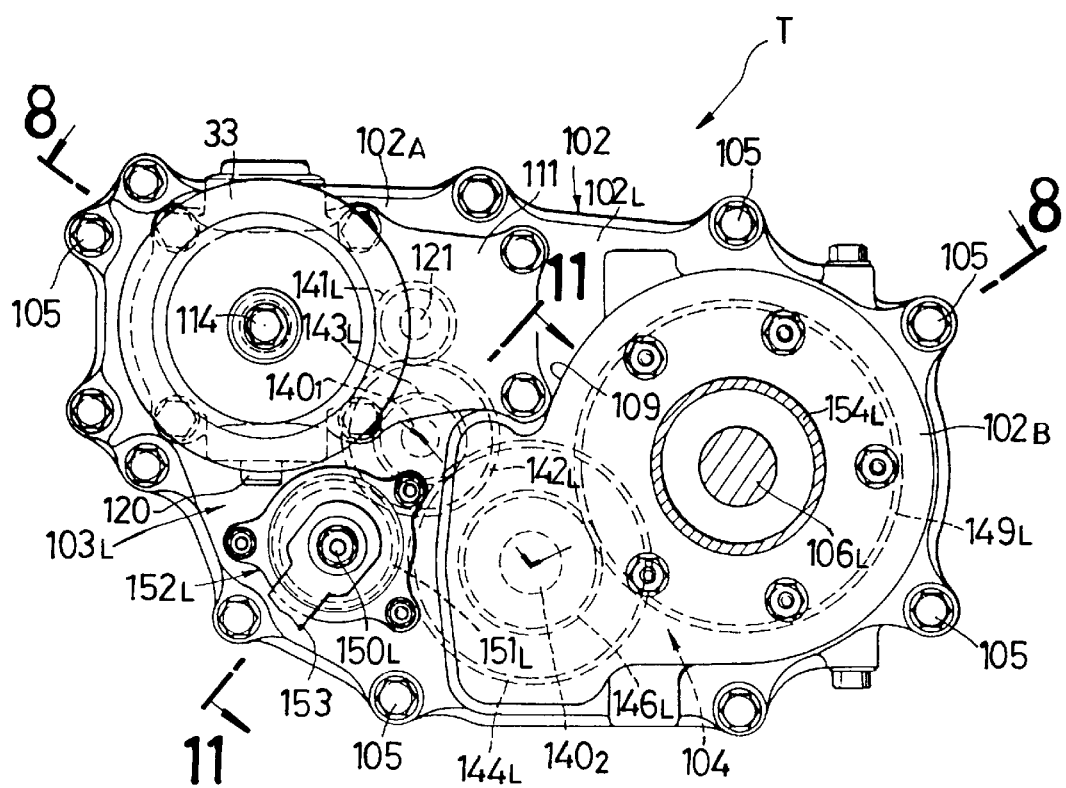
Figure 8:
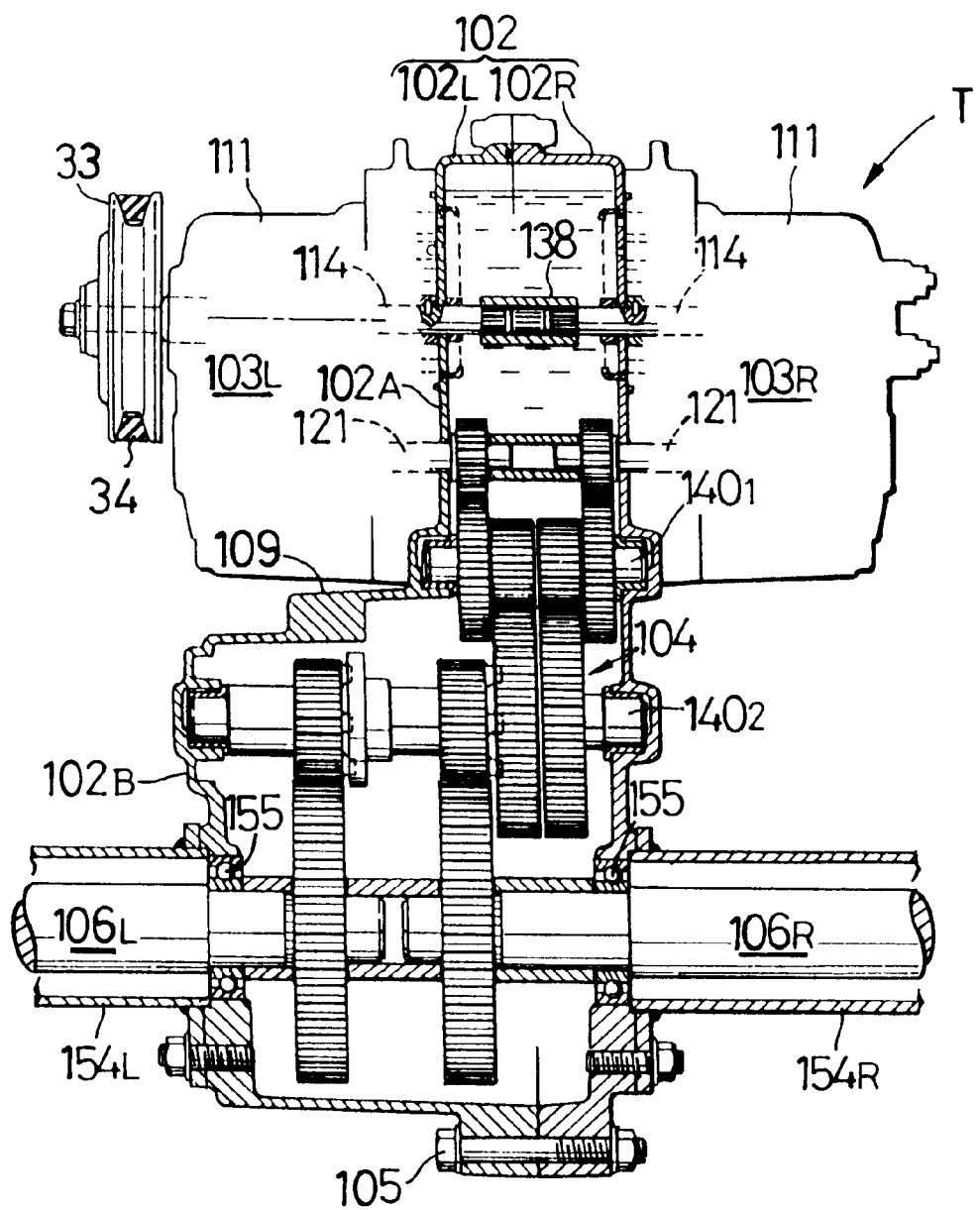

In FIGS. 7 and 8, the transmission system T includes a transmission case 102, a pair of hydrostatic continuously variable transmissions $103_R$, $103_L$ provided on the right and left sides of the transmission case 102 respectively, a speed reduction device 104 disposed in the transmission case 102, and a pair of axles $106_R$, $106_L$ penetrating through right and left side walls of the transmission case 102 respectively, and right and left rear wheels Wr are provided at outer ends of these axles $106_R$, $106_L$.

The transmission case 102 is formed by joining open ends of right case half $102_R$ and left case half $102_R$ split on a plane orthogonal to an axial line of the axles $106_R$, $106_L$, separably through bolts 105. The outer side of the left case half $102_L$ is more projected at its lower half than at its upper half, so as to form a step 109 therebetween, whereas the right case half $102_R$ is formed generally flat on the outer side surface. In this way, the transmission case 102 has a narrow portion $102_A$ above the step 109 and a wide portion $102_B$ below the step 109, and a pair of hydrostatic continuously variable transmissions $103_R$, $103_L$ are provided on the right and left sides of the narrow portion $102_A$.

The right and left axles $106_R$, $106_L$ are supported within cylindrical axle cases $154_R$, $154_L$ by bearings 155,155 mounted on right and left side walls of the wide portion $102_B$ of the transmission case 102.

Figure 9:
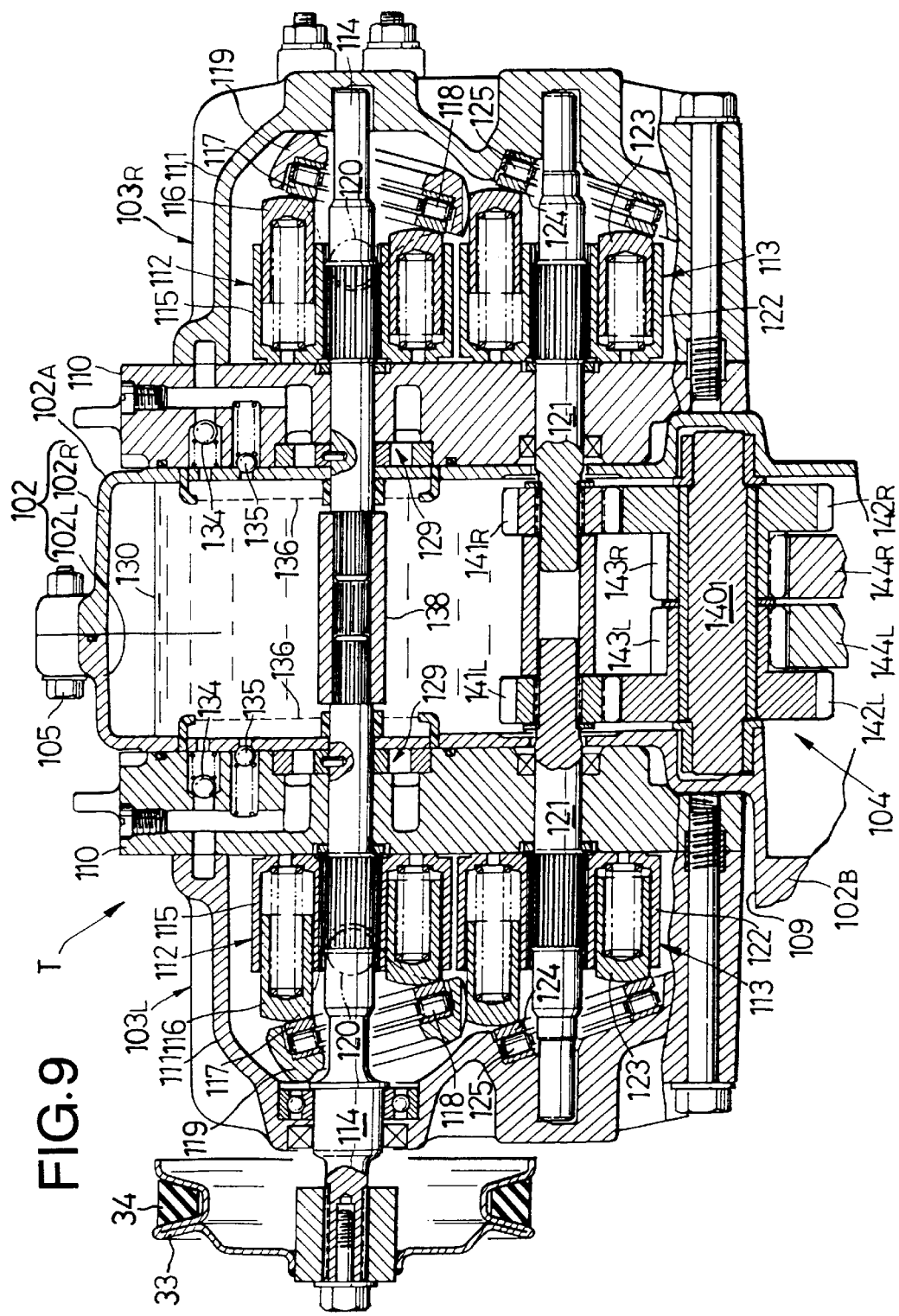

As shown in FIGS. 7 and 9, right and left hydrostatic continuously variable transmissions $103_R$, $103_L$ are identical in structure, and disposed symmetrically. Each of the hydrostatic continuously variable transmissions $103_R$, $103_L$ includes a distribution plate 110 bolted separably to the outer side of the case halves $102_R$, $102_L$ of the same side, a housing 111 bolted to the distribution plate 110, and a hydraulic pump 112 and a hydraulic motor 113 disposed in the housing 111. The hydraulic pump 112 includes a pump shaft 114 penetrating through the distribution plate 110, pump cylinders 115 spline-coupled to the pump shaft 114 and slidably and rotatably connected closely with the distribution plate 110, multiple pump plungers 116 slidably fitted to the pump cylinders 115 in an annular arrangement surrounding the pump shaft 114, a pump swash plate 117 abutting against outer ends of these pump plungers 116, and a swash plate holder 119 for bearing the back side of the plate 117 with a thrust bearing 118, and the swash plate holder 119 is supported on the housing 111 through a pair of trunnion shafts 120 of which axial line is orthogonal to the axial line of the pump shaft 114, and the pump swash plate 117 is tiltable between one maximum inclination position (forward top position) and other maximum inclination position (reverse top position) through an erect position (neutral position) orthogonal to the pump shaft 114. At the outer ends of the trunnion shafts 120 of the right and left swash plate holders 119, speed change arms $249_R$, $249_L$ (speed change follower member, speed change control member) are secured, and by turning these speed change arms $249_R$, $249_L$, the angle of each swash plate 117 can be adjusted.

On the other hand, the hydraulic motor 113 includes a motor shaft 121 penetrating through the distribution plate 110, motor cylinders 122 spline-coupled with the motor shaft 121 and slidably and rotatably connected closely with the distribution plate 110, a large number of motor plungers 123 annularly arranged such as to surround the motor shaft 121 and slidably fitted to the motor cylinders 122, and a motor swash plate 124 abutting against outer ends of these motor plungers 123, and the back side of the motor swash plate 124 is supported in the housing 111 through a thrust bearing 125 in a state inclined by a specific angle to the motor shaft 121.

The right and left pump shafts 114, 114 are coupled coaxially through a joint 138 in the narrow portion 102a. On the other hand, right and left motor shafts 121, 121 are disposed so as to be rotatable relatively and coaxially.

Figure 12:
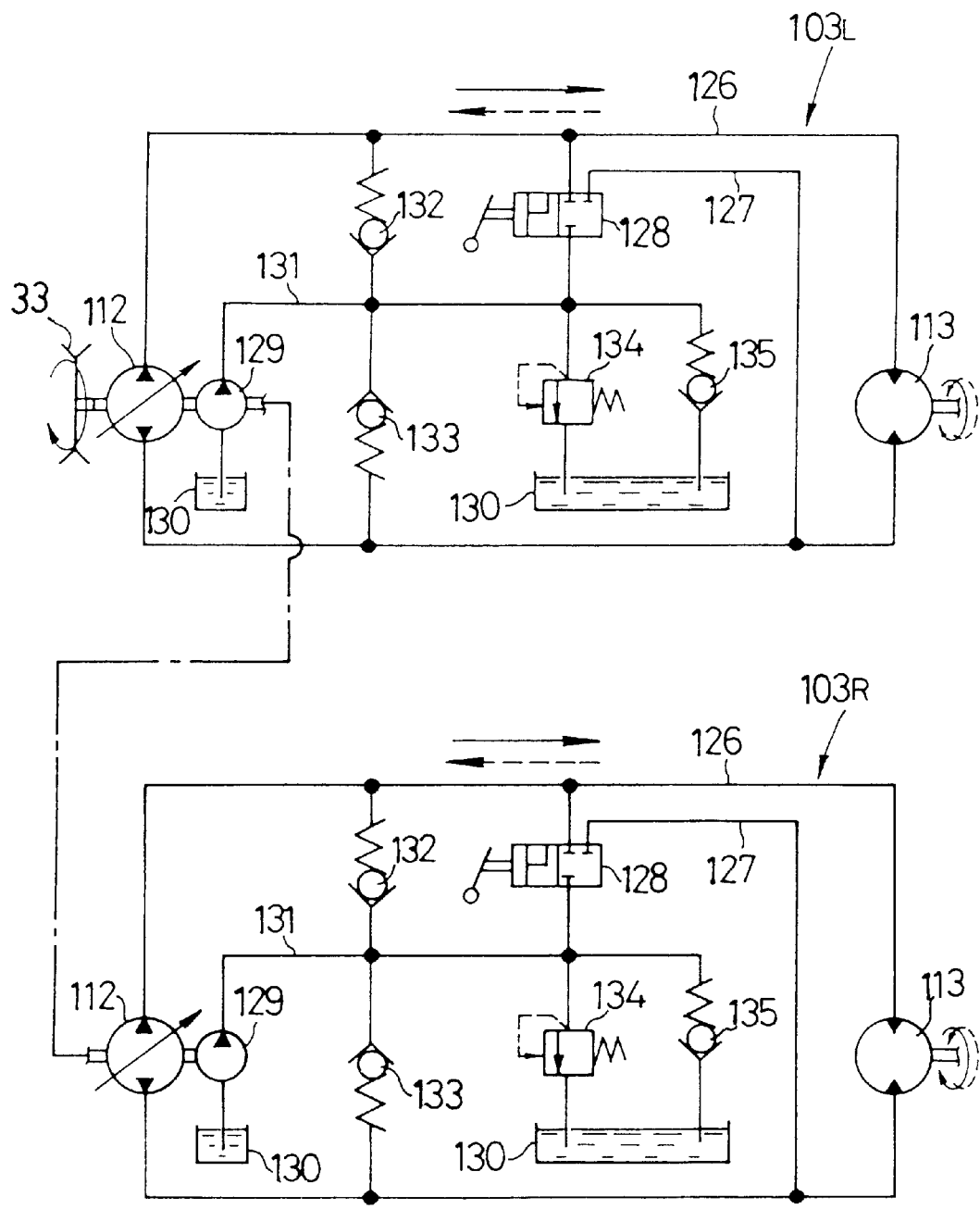
Figure 13:
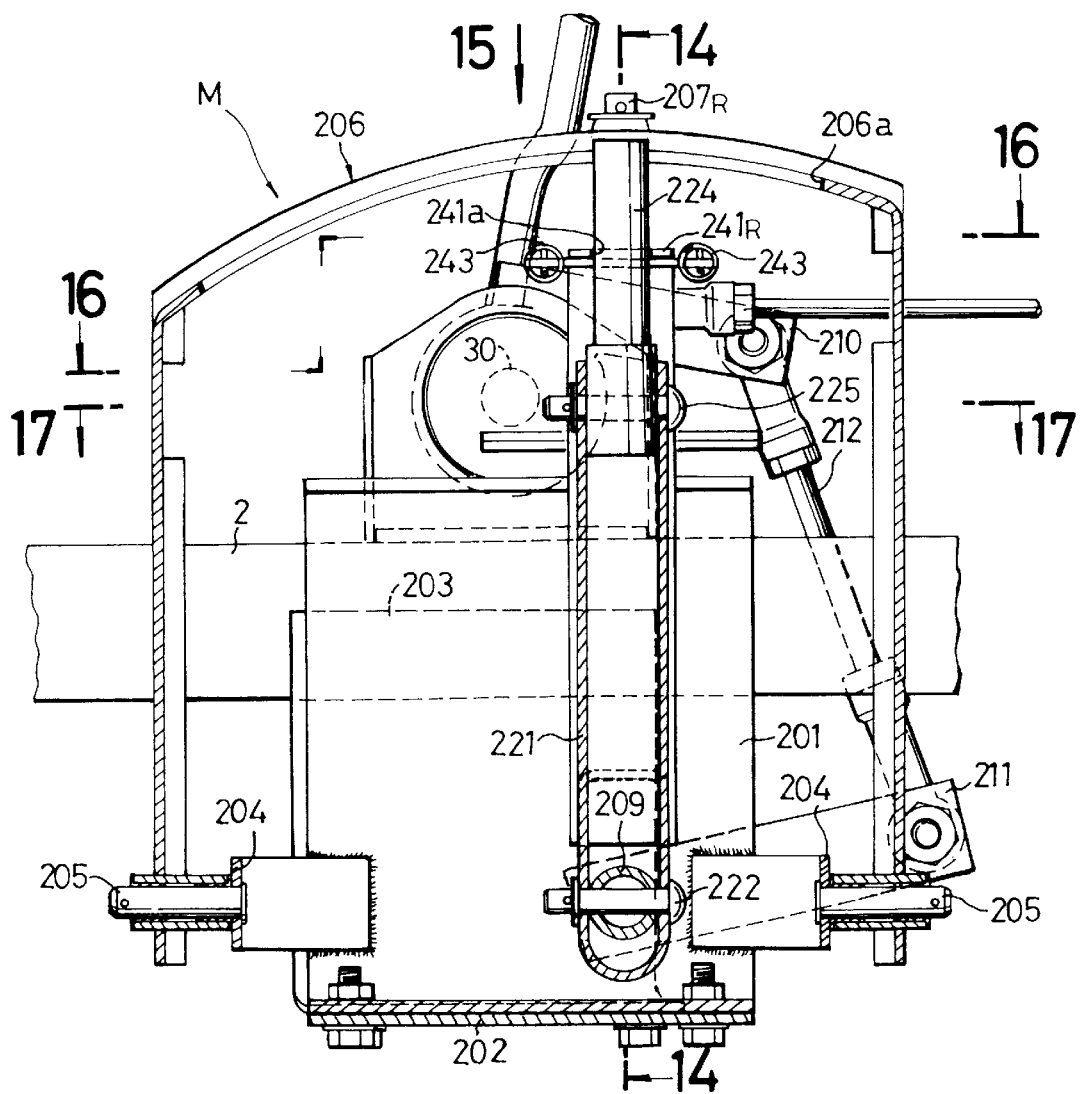
Figure 14:
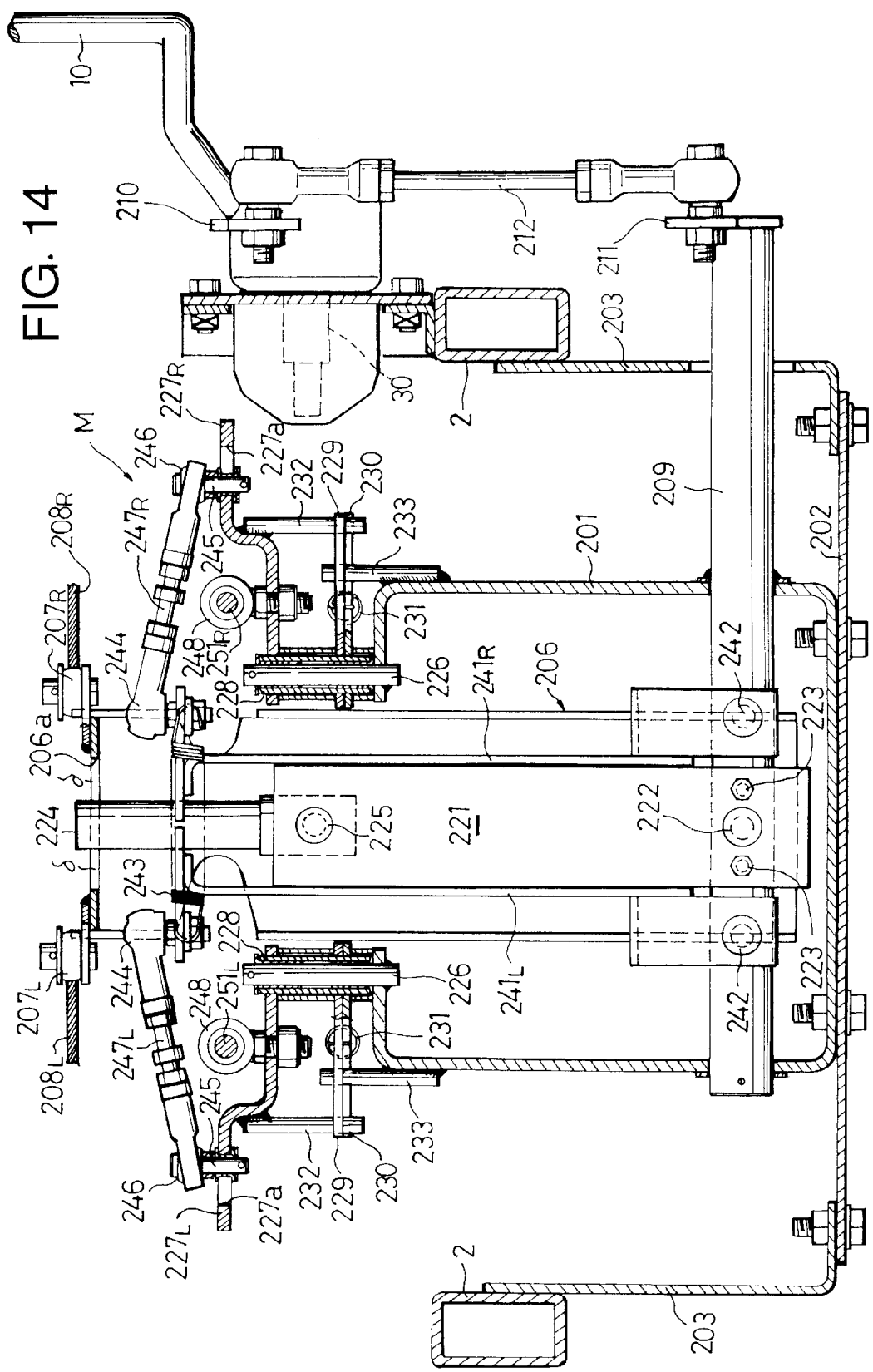
Figure 15:
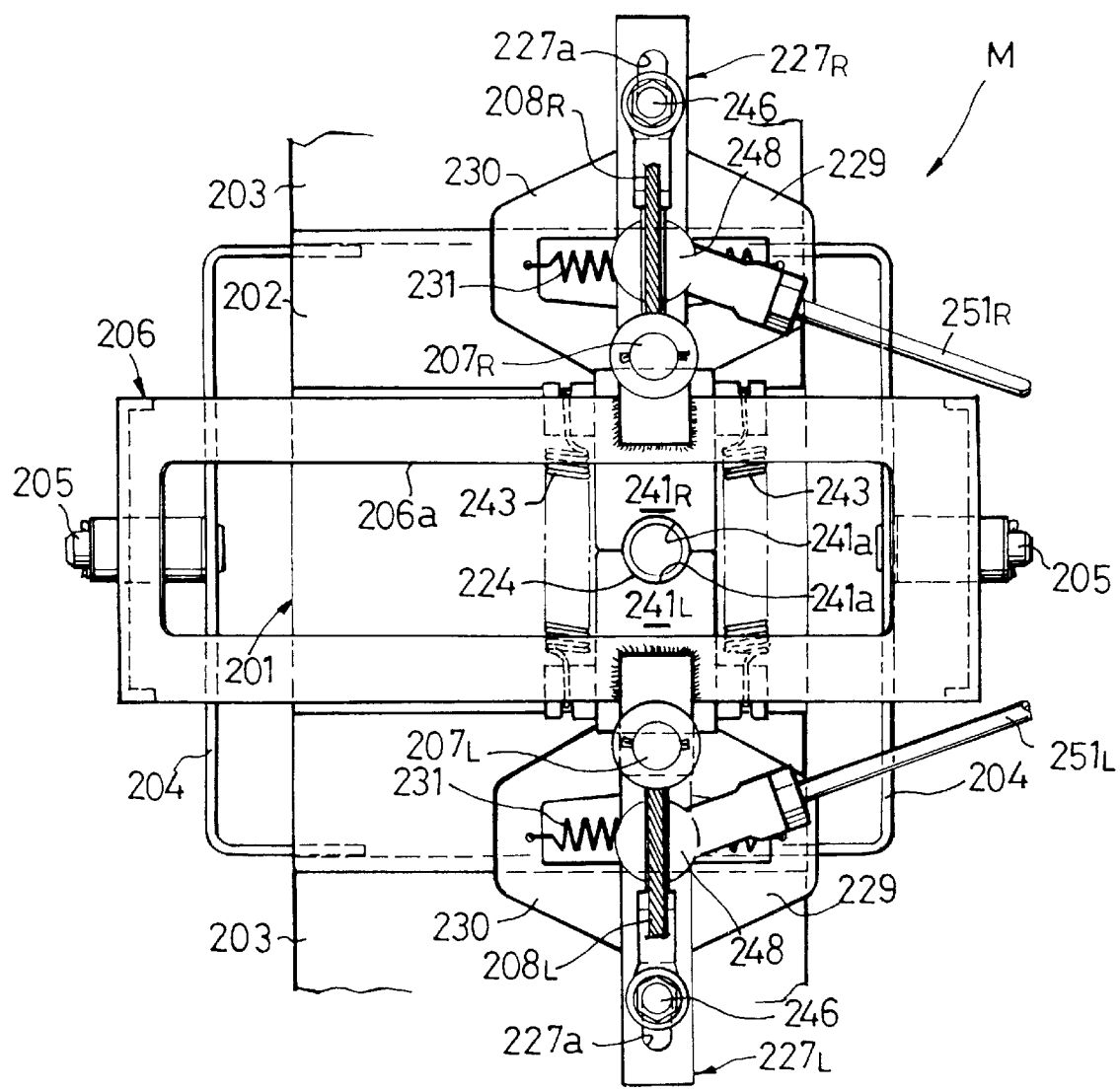
Figure 16:
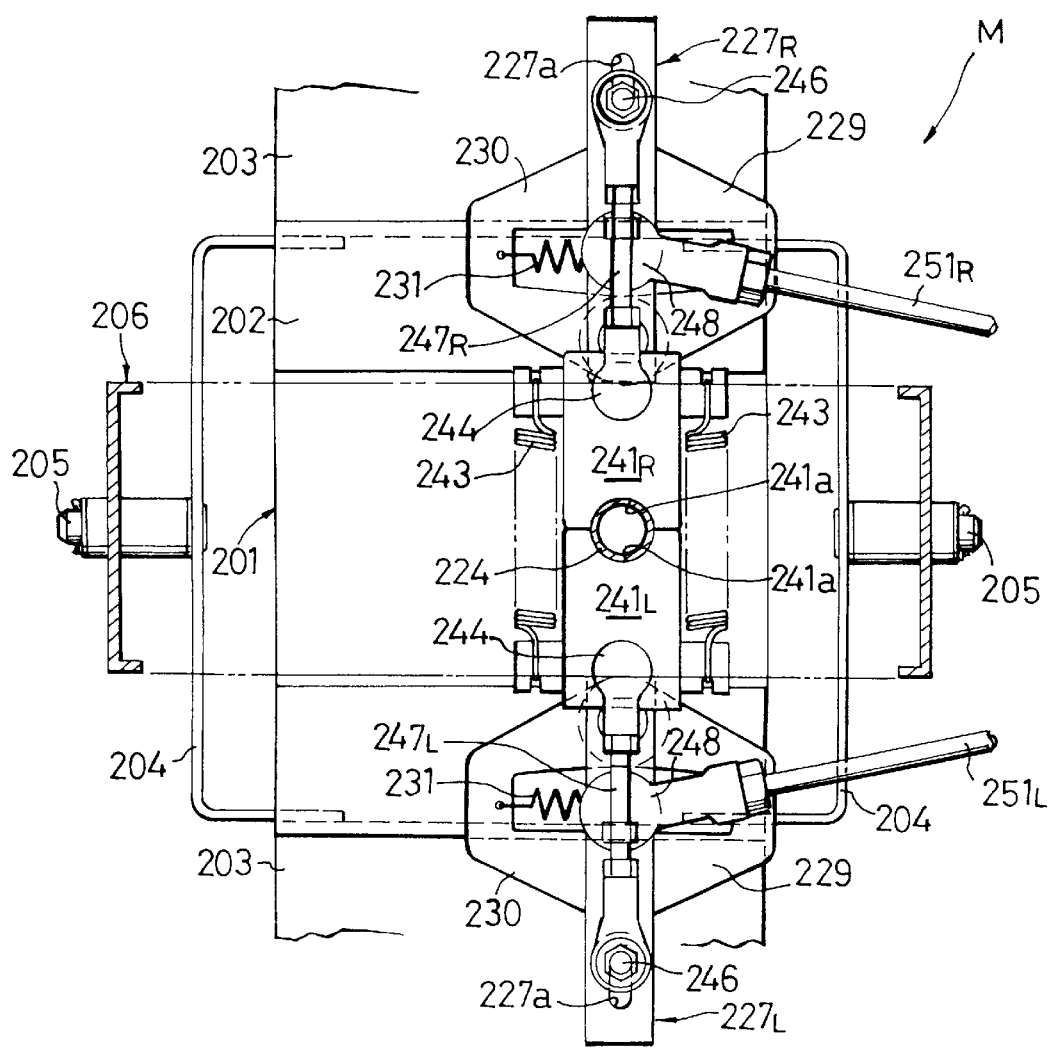
Figure 17:
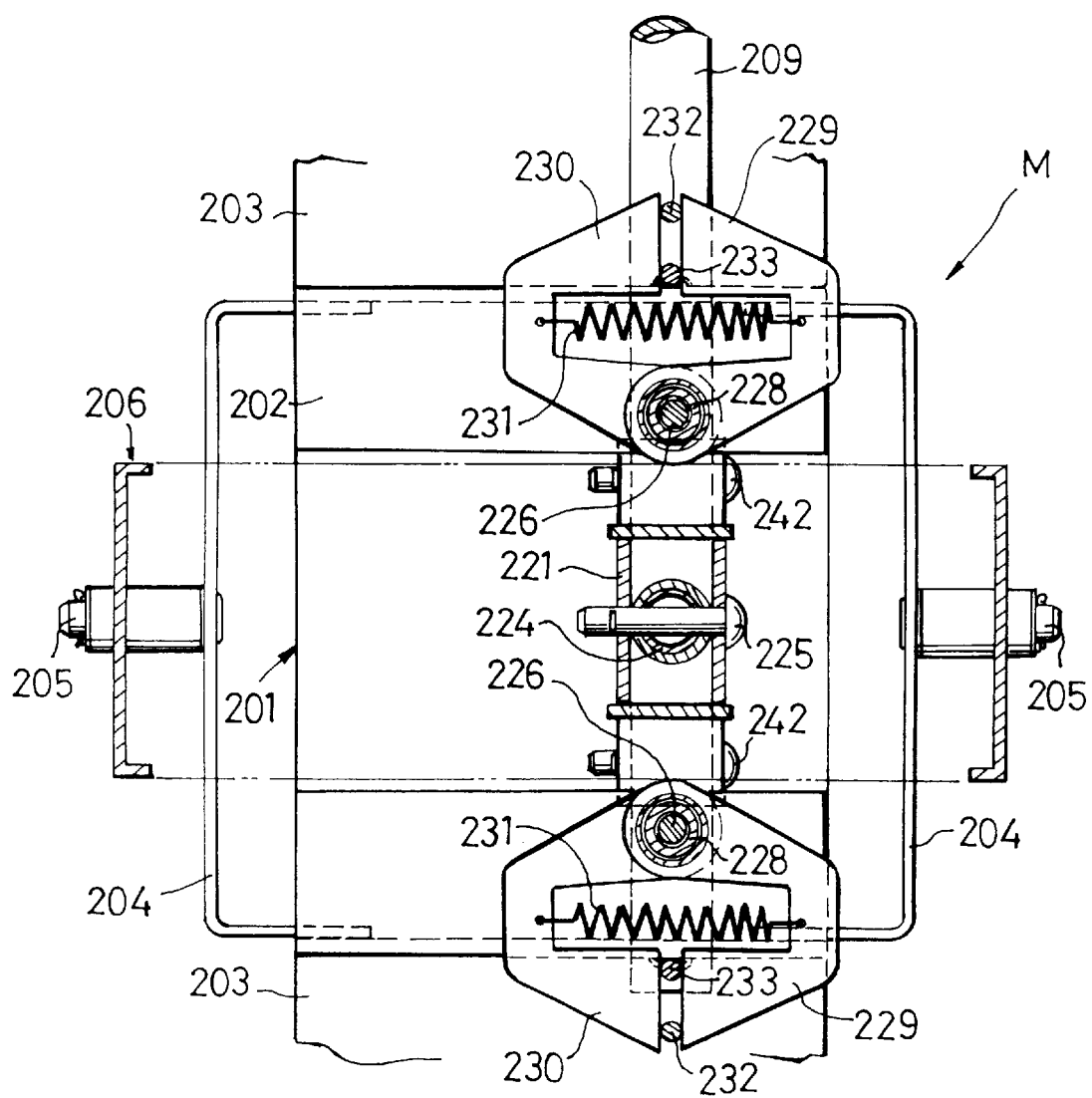

As shown in FIG. 12, in the hydrostatic continuously variable transmissions $103_R$, $103_L$, the hydraulic pump 112 and hydraulic motor 113 are mutually connected through a hydraulically closed circuit 126. In the hydraulically closed circuit 126, a bypass passage 127 is provided for connecting between a high pressure side and a low pressure side of the circuit 126, and a release valve 128 opened and closed by manual operation is interposed in the passage 127. The hydraulic pump 112 is connected to a working oil supply pump 129 driven by the pump shaft 114. The working oil supply pump 129 operates to pump up the working oil from an oil sump 130 to send it under pressure to an oil feed passage 131, and the oil feed passage 131 is connected to the high pressure side and low pressure side of the hydraulically closed circuit 126 through one-way valves 132, 133, respectively. If necessary, the oil feed passage 131 may be connected to the oil sump 130 through relief valve 134 and suction valve 135 which are in mutual parallel relation.

When the release valve 128 is closed, if the hydraulic pump 112 is driven in a state where the pump swash plate 117 is inclined to the forward side, the working oil flows in the hydraulically closed circuit 126 in the direction of a solid line arrow. At that time, the motor shaft 121 of the hydraulic motor 113 rotates normally at the current ratio of the capacity of the hydraulic pump 112 and the capacity of the hydraulic motor 113 as the speed change ratio. On the other hand, if the pump swash plate 117 is inclined to the reverse side, the working oil flows in the hydraulically closed circuit 126 in the direction of a broken line arrow, so that the motor shaft 121 rotates reversely. At that time, if an oil leak occurs in the hydraulically closed circuit 126, one of the one-way valves 132 and 133 which corresponds to the low pressure side at this time opens, and the working oil is supplied from the working oil supply pump 129 into the hydraulically closed circuit 126. If a pressure in the oil feed passage 131 is increased by a certain value, the relief valve 134 is opened so as to prevent the pressure in the oil feed passage 131 from excessively increasing. When the high pressure side and low pressure side are suddenly inverted in the hydraulically closed circuit 126 due to an engine brake, if a supply of the working oil to the low pressure side from the working oil supply pump 129 is insufficient, the suction valve 135 is opened, and the oil in the oil sump 130 is sucked into the low pressure side, thereby preventing air suction by the hydraulically closed circuit 126.

In FIG. 9, the oil sump 130 is defined between both the case halves $102_R$, $102_L$ of the transmission case 102. Inside each distribution plate 110, there is disposed an oil filter 136 immersed in the oil sump 130 through each suction port of the working oil supply pump 129 and suction valve 135, and the working oil to be supplied into the working oil supply pump 129 and suction valve 135 is filtered.

Figure 10:
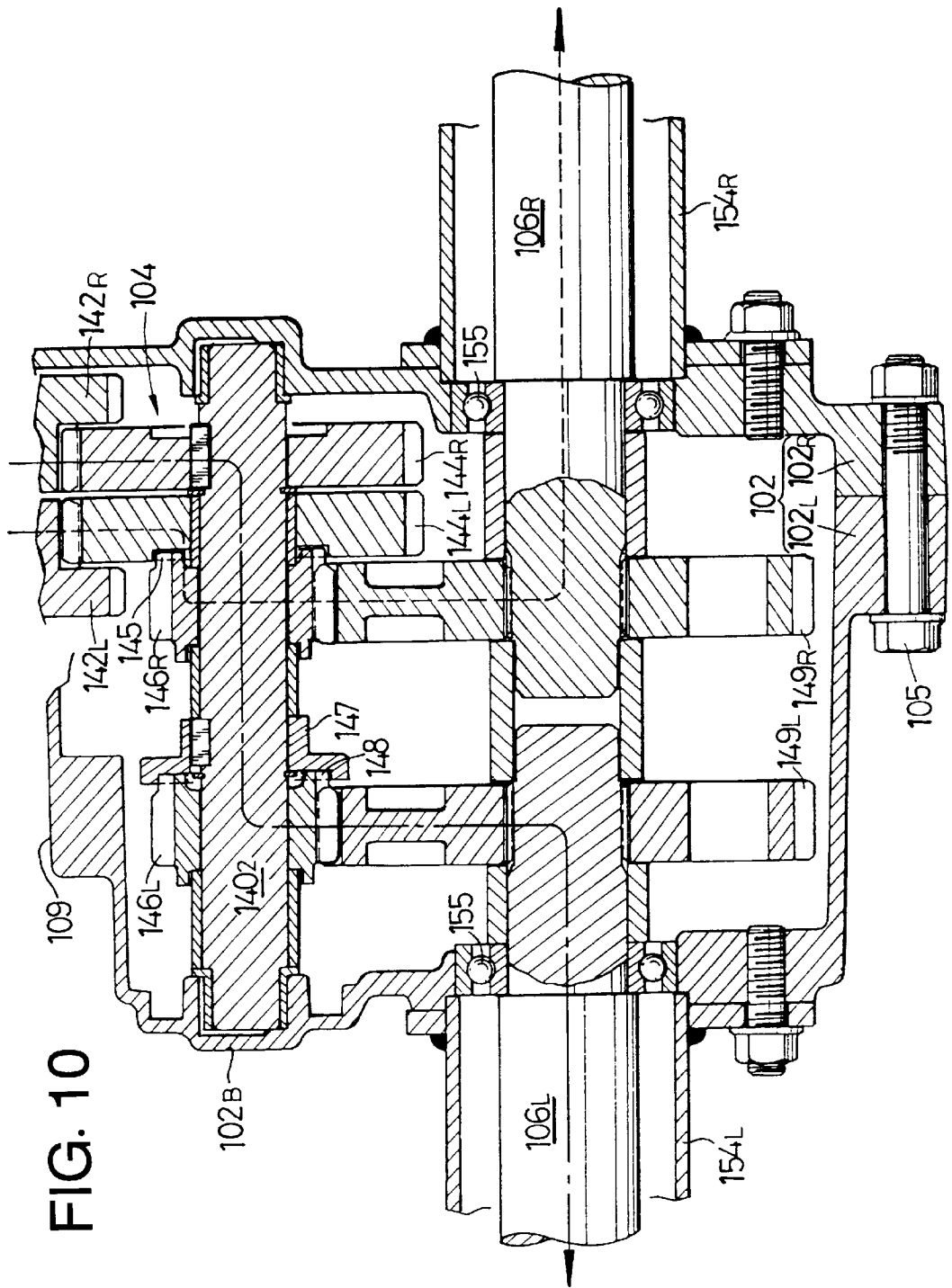

As shown in FIGS. 9 and 10, the speed reduction device 104 includes first and second intermediate shafts $140_1$, $140_2$ rotatably supported, in parallel to the axles $106_R$, $106_L$, on the narrow portion $102_A$ and wide portion $102_B$ of the transmission case 102, respectively, a pair of right and left first small gears $141_R$, $141_L$ secured to the inner ends of the right and left motors 121, 121, respectively, a pair of right and left first large gears $142_R$, $142_L$ engaged with the first gears $141_R$, $141_L$ and rotatably supported on the first intermediate shaft $140_1$, a pair of right and left second small gears $143_R$, $143_L$ formed integrally with opposed ends of the first large gears $142_R$, $142_L$, respectively, a right second large gear $144_R$ engaged with the right second gear $143_R$ and coupled by key or spline to the right end of the second intermediate shaft $140_2$ facing the narrow portion $102_A$ of the second intermediate shaft, a left second large gear $144_L$ engaged with the left second gear $143_L$ and rotatably supported on the second intermediate shaft $140_2$ adjacent to the left side of the right second large gear $144_R$, a right final gear $146_R$ rotatably supported on the second intermediate shaft $140_2$ and coupled to the left end of the left second large gear $144_L$ through a dog clutch 145, a clutch body 147 coupled by key or spline with the second intermediate shaft $140_2$ at the left side of the right final gear $146_R$, a left final gear $146_L$ rotatably supported on the second intermediate shaft $140_2$ and coupled to the left end of the clutch body 147 through a dog clutch 148, and a pair of right and left final large gears $149_R$, $149_L$ spline-coupled with the right and left axles $106_R$, $106_L$ and engaged with the right and left final gears $146_R$, $146_L$, respectively. The driving force of the right side hydraulic motor 113 is transmitted to the left side axle $106_L$, and the driving force of the left side hydraulic motor 113 is transmitted to the right side axle $106_R$.

Figure 11:
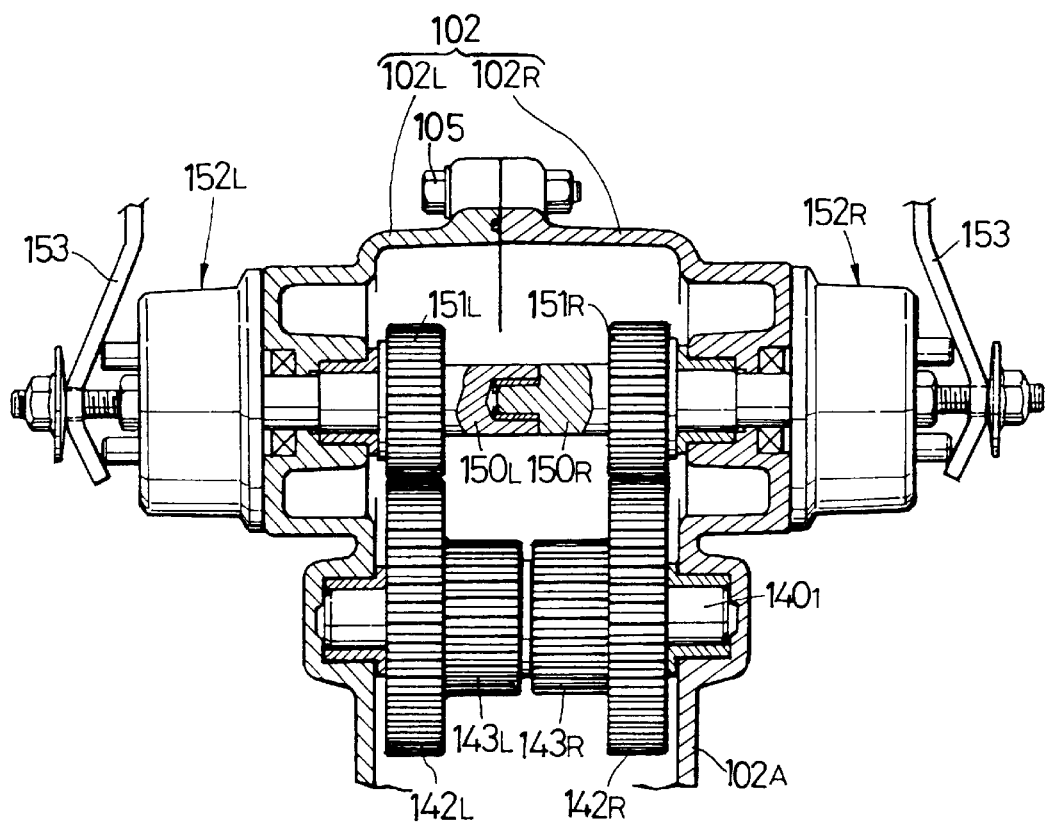

As shown in FIGS. 7 and 11, in the narrow portion $102_A$ of the transmission case 102, a pair of right and left brake shafts $150_R$, $150_L$ parallel to the first intermediate shaft $140_1$ and coaxial with each other are relatively rotatably supported, and these brake shafts $150_R$, $150_L$ are secured with a pair of brake gears $151_R$, $151_L$ to be engaged with the first large gears $142_R$, $142_L$ respectively. The right and left brake shafts $150_R$, $150_L$ are projected to the right and left sides of the narrow portion $102_A$, and are respectively provided with brake devices $152_R$, $152_L$ operated by a tension of a brake lever 153.

Instead of engaging gears $151_R$, $151_L$ with the first large gears $142_R$, $142_L$, the brake gears $151_R$, $151_L$ may be engaged with the second gears $144_R$, $144_L$.

As shown in FIGS. 4 and 6, one of the pump shafts 114 projects outward from the front part of the left case half $102_L$. An endless belt 34 is wound between a transmission drive pulley 32 provided on the crankshaft 11 of the engine E and a transmission driven pulley 33 provided on the one pump shaft 114. A tension pulley 38 is provided at a tip end of a tension pulley support arm 37 which is pivoted on a pivot 35 and biased by a spring 36. The tension pulley 38 abuts against the endless belt 34 to generate a predetermined tension.

In this way, the driving force of the engine E is distributed to the pump shafts 114, 114 of right and left hydrostatic continuously variable transmissions $103_R$, $103_L$ through the transmission drive pulley 32, the endless belt 34, and the transmission driven pulley 33, and such distributed driving forces are properly changed in speeds, and then, outputted to the speed reduction device 104 through corresponding motor shafts 121, 121. The driving force outputted to the speed reduction device 104 from the motor shaft 121 of the right side hydrostatic continuously variable transmission $103_R$ is transmitted to the left side axle $106_L$, whereas the driving force outputted to the speed reduction device 104 from the motor shaft 121 of the left side hydrostatic continuously variable transmission $103_L$ is transmitted to the right side axle $106_R$, so that the right and left rear wheels Wr are driven to travel the working vehicle 1.

In this case, in the right and left hydrostatic continuously variable transmissions $103_R$, $103_L$, if both the pump swash plates 117, 117 are tilted to the forward side, both motor shafts 121, 121 rotate normally, and the working vehicle 1 travels forward. And if the pump swash plates 117, 117 are tilted to the reverse side, the motor shafts 121, 121 rotate reversely, and the working vehicle 1 can travel backward. Moreover, by varying the speed change ratio of the right and left hydrostatic continuously variable transmissions $103_R$, $103_L$ such that the tilting angles of the right and left pump swash plates 117,117 become different from each other, a difference is caused in the rotating speeds of the right and left motor shafts 121, 121, so that the working vehicle 1 can turn.

The rotating speed of the engine E is variable, but it is fixed at 3300 RPM in an ordinary operating state.

As clear from FIGS. 7 and 9, the transmission system T has a pair of right and left hydraulic motors 113, 113 disposed in the rear of the pair of right and left hydraulic pumps 112, 112, and the speed reduction device 104 is disposed in the rear of the hydraulic motors 113, 113. Therefore, the dimension in the vertical direction is extremely small, and moreover the transmission system T is mounted within a projection area of the rear wheels Wr as viewed on a side plane (see FIG. 1), and therefore stacking of the vehicle body can reliably be prevented while sufficiently maintaining the minimum height from the ground. Further, the position of the center of gravity of the transmission system T is brought closer to the axles 106R, 106L to enhance the working stability, while the space near the axles 106R, 106L may be utilized effectively. Besides, since the vertical dimension of the transmission system T is small, the position of the engine E mounted in the upper part is lowered to lower the center of gravity of the vehicle body, so that the working stability is further enhanced.

Relating to FIGS. 1 to 6, the transmission of power from the engine E to the rotary working machine R is described below.

A working machine-lifting/lowering shaft 62 extending in the lateral direction of the vehicle body is rotatably supported on a bracket 61 projecting backward from the rear-most cross frame $3_5$. A working machine drive pulley 63 provided on the crankshaft 11 of the engine E and a working machine driven pulley 64 provided on the working machine-lifting/lowering shaft 62 are connected through an endless belt 65, and a tension clutch C for controlling the tension of the endless belt 65 is connected to the clutch lever 9 which is pivoted to the vehicle body front portion swingably in the longitudinal direction through a pivot 66.

That is, a transmission shaft 68 extending in the vertical direction is rotatably supported on a bracket 67 provided on the left side frame 2, and an arm 69 secured to this transmission shaft 68 is connected to the lower end of the clutch lever 9 through a link 70. A tension pulley 73 provided at one end of an L-shaped support arm 72 having the intermediate portion pivoted through a pivot 71 abuts against the endless belt 65, and the other end of the support arm 72 is connected to another arm 60 secured to the transmission shaft 68 by means of a Bowden wire 75 having a buffer spring 74 incorporated therein. The transmission shaft 68 is biased in the counterclockwise direction in FIG. 6 (that is, OFF direction of tension clutch C) by a return spring 76.

When the clutch lever 9 is pushed forward to turn on the tension clutch C, the transmission shaft 68 is turned in the clockwise direction from the OFF position to the ON position against the return spring 76 to pull the Bowden wire 75, and the support arm 72 oscillates, so that the tension pulley 73 is pushed to the endless belt 65. In this way, the tension clutch C is turned on, and the rotation of the crankshaft 11 of the engine E is transmitted to the working machine-lifting/lowering shaft 62. When the transmission shaft 68 turns from the OFF position to the ON position, it passes the neutral point, and therefore the transmission shaft 68 is stably held at the ON position by the tension of the buffer spring 74 through the Bowden wire 75. When the clutch lever 9 is pulled back to turn off the tension clutch C, the transmission shaft 68 is turned to the OFF position by the elastic force of the return spring 76, and is held there stably.

A rear chain case 79 is coupled through an intermediate case 78 to the rear end of a front chain case 77 pivoted on the working machine-lifting/lowering shaft 62 so as to be swingable vertically, and the rotary working machine R including the front chain case 77, intermediate case 78, and rear chain case 79 is driven vertically by a working machine elevating cylinder 80 attached to the bracket 61. That is, a first bracket 85 and a second bracket 86 are pivoted on the working machine-lifting/lowering shaft 62 so as to be swingable vertically. The first bracket 85 is coupled with the rear chain case 79 through a coupling member 87, and the second bracket 86 is connected to the working machine elevating cylinder 80. The second bracket 86 is opposed to the lower side of the first bracket 85, and when the second bracket 86 is swung vertically by the working machine elevating cylinder 80, the first bracket 85 pressed by the second bracket 86 oscillates upward together with the rotary working machine R. If the working machine elevating cylinder 80 does not operate, the rotary working machine R can oscillate freely upward about the working machine-lifting/lowering shaft 62 by the reaction from the ground.

A plurality of tilling blades 81 provided at the rear end of the rear chain case 79 are connected to the working machine-lifting/lowering shaft 62 by a chain transmission mechanism not shown accommodated in the front chain case 77, intermediate chain case 78, and rear chain case 79 and driven for rotation. Reference numeral 82 in the drawing denotes a cover for the tilling blades 81, 83 is a resistance rod, and 84 is a leveling plate.

As mentioned herein, the cylinder 12 of the engine E mounted on the rear part of the vehicle body frame F is directed upward and rearward, and the working machine-lifting/lowering shaft 62 is arranged in the lower space of the cylinder 12 of the engine E in side view, and therefore the waste space behind the vehicle body frame F can be effectively utilized. Moreover, the rotary working machine R can be brought closer to the vehicle body to decrease the moment transmitted from the rotary working machine R to the vehicle body to the utmost, which unnecessitates a reinforcement of the vehicle body so that the weight can be reduced. Still more, the followability of the rotary working machine R to the vehicle body is improved, and a tilling operation of a head land becomes easy and thus, non-tilled land decreases, and the stability of working vehicle 1 is enhanced.

As clear from FIG. 1, when the rotary working machine R reaches the chain line position which is the upward swing end, an upper end of the rotary working machine R is lower than an upper end of the muffler 14M. Therefore, it is not only possible to enhance the stability by keeping low the position of center of gravity of the rotary working machine R, but also the rear visibility is improved because blocking of the vision of the driver seated on the seat 7 by the rotary working machine R is prevented. Still more, the space S between the rotary working machine R and muffler 14M is widely kept, and the exhaust gas emitted from the exhaust $14M_1$ of the muffler 14M is swiftly diffused to flow out backward and sideways, and the exhaust hardly flows to the driver side, and a comfortable working is realized.

Referring next to FIGS. 13 to 18, the structure of speed change operating device M for moving the working vehicle 1 back and forth, and turning right and left by mixing the operation of the steering wheel 8 and operation of change lever 10 is described in detail below. The speed change operating device M constitutes the steering characteristic changeover means of the invention.

The speed change operating device M has a base member 201 of a C-shaped section having right and left side walls and a bottom wall, with an upper surface opened. A support plate 202 superposed with the lower side of the base member 201 is suspended and supported by side frames 2, 2 by a pair of right and left stays 203, 203 each having an L-form in front view. Pivots 205, 205 extending in the longitudinal direction are projected from a pair of brackets 204, 204 of a U-shape as viewed on a plane, the brackets being welded to front and rear portions of the base member 201. Front and rear lower ends of a guide member 206 (second speed change operating member) in a reverse U form in side view are pivoted on these pivots 205, 205 so as to be swingable in the lateral direction.

A pair of Bowden wires $208_R$, $208_L$ coupled at one end to a pair of wire joints $207_R$, $207_L$ provided at the upper end of the guide member 206 are coupled at other end to the sector gear 24 (see FIG. 5) turned by the steering wheel 8. Therefore, by operating the steering wheel 8 to turn the working vehicle 1, the guide member 206 oscillates laterally about the pivots 205, 205 through the Bowden wires $208_R$, $208_L$.

In the lower part of the base member 201, a rotary shaft 209 (lateral shaft) extending in the lateral direction is rotatably supported. An arm 210 secured to the pivot 30 of the change lever 10 and an arm 211 secured to the right end of the rotary shaft 209 are coupled through a rod 212, and by swinging the change lever 10 back and forth, the rotary shaft 209 turns.

A first swing member 221 formed in a U form in side view is fitted to the middle of the rotary shaft 209 so as to clamp the latter, and is pivoted so as to oscillate laterally by a lower pivotal pin 222 penetrating through the rotary shaft 209. Two bolts 223, 223 penetrating through the rotary shaft 209 at right and left sides of the lower pivotal pin 222 are loosely inserted through the first swing member 221. Therefore, the first swing member 221 can finely adjust its angle in the lateral direction about the lower pivotal pin 222 by an amount corresponding to the gap between the bolts 223, 223 and first swing member 221, and the angle can be fixed by tightening the bolts 223, 223.

At the upper end of the first swing member 221, the lower end of a mixing lever 224 (mixing member) is pivoted so as to be swingable laterally through an upper pivotal pin 225. The mixing lever 224 is freely fitted to a guide groove 206a formed in the longitudinal direction on the top of the guide member 206. Therefore, by operating the change lever 10, when the first swing member 221 is swung longitudinally together with the rotary shaft 209, the mixing lever 224 oscillates longitudinally along the guide groove 206a. By operating the steering wheel 8, when the guide member 206 is swung laterally about the pivots 205, 205, the mixing lever 224 abutting against and pressed by the guide groove 206a oscillates laterally about the upper pivotal pin 225. At this time, by the gap δ (see FIG. 14) formed between the mixing lever 224 and guide groove 206a, the mixing lever 224 does not oscillate at the steering angle of 0° to ±100° of the steering wheel 8, but oscillates at the steering angle of ±100° to ±200°.

On a pair of right and left pivots 226, 226 planted on the top of the base member 201, base ends of a pair of right and left control arms $227_R$, $227_L$ (speed change control member, speed change drive member) are supported so as to be swingable longitudinally through collars 228, 228. On each pivot 226, upper and lower neutral plates 229, 230 are pivoted, and are biased in the mutually approaching direction by a neutral spring 231. A neutral pin 232 fixed downward in the control arms $227_R$, $227_L$, and a neutral pin 233 fixed upward in the base member 201 are clamped between the two neutral plates 229, 230. Therefore, the control arms $227_R$, $227_L$ are biased toward the neutral position, or the linearly extending position in the lateral direction.

On the other hand, at right and left sides of the first swing member 221, the lower ends of a pair of second swing members $241_R$, $241_L$ (first speed change operating members) are pivoted on the rotary shaft 209 through pins 242, 242 (longitudinal shafts) so as to be swingable laterally. The pair of second swing members $241_R$, $241_L$ are biased in the mutually approaching direction by a pair of front and rear neutral thrusting springs 243, 243, and arc recesses 241a, 241a formed at their inner ends abut against the outer circumference of the mixing lever 224, and their confronting surfaces abut against the right and left outer surfaces of the first swing member 221, so as to be stably held at the neutral position.

At the outer ends of the pair of second swing members $241_R$, $241_L$ (first speed change operating members), corresponding inside ball joints 244, 244 are provided. At the tip ends of the control arms $227_R$, $227_L$, slots 227a, 227a extending in the longitudinal direction of the control arms $227_R$, $227_L$ are formed, and outside ball joints 246, 246 are slidably supported in these slots 227a, 227a through pins 245, 245. The inside ball joints 244, 244 and outside ball joints 246, 246 are coupled together via a pair of push-pull rods $247_R$, $247_L$ (link members) capable of adjusting the length in a turnbuckle system. When the mixing lever 224 is at the vertical neutral position, the push-pull rods $247_R$, $247_L$ are superposed from an upper side with the control arms $227_R$, $227_L$, and the pins 245, 245 of the outside ball joints 246, 246 at this time abut against the inner ends of the slots 227a, 227a of the control arms $227_R$, $227_L$.

A pair of front ball joints 248, 248 provided in the middle of the right and left control arms $227_R$, $227_L$, and a pair of rear ball joints 250, 250 provided at the front end of the speed change arms $249_R$, $249_L$ secured to the upper ends of the pair of trunnion shafts 120, 120 of the transmission system T are coupled together via a pair of pushpull rods $251_R$, $251_L$ (link members) capable of adjusting the length in a turnbuckle system. Therefore, when the change lever 10 and steering wheel 8 are operated, in cooperation with the oscillation of the control arms $227_R$, $227_L$ of the speed change operating device M, the speed change arms $249_R$, $249_L$ of the transmission system T oscillate, thereby increasing or decreasing the rotating speed of the right and left rear wheels Wr.

As described herein, the speed change operating device M is disposed beneath the seat 7 provided in the middle in the longitudinal direction and lateral direction of the vehicle body, and the transmission system T is disposed closely behind the speed change operating device M, and the control arms $227_R$, $227_L$ of the speed change operating device M and the speed change arms $249_R$, $249_L$ for controlling the speed change ratio of the hydrostatic continuously variable transmissions $103_R$, $103_L$ of the transmission system T are connected through push-pull rods $251_R$, $251_L$ extending in the longitudinal direction of the vehicle body, and therefore, not only the waste space beneath the seat 7 can be effectively utilized, but also the balance of weight distribution and space distribution in the lateral direction of the vehicle body may be enhanced, and moreover the push-pull rods $251_R$, $251_L$ are kept to a minimum required length, so that formation of deflection and backlash may be prevented.

The operation of the embodiment of the invention having such constitution is described below.

When the right and left control arms $227_R$, $227_L$ are both moved forward from the neutral position, the rotating speed in the normal rotating direction of the right and left hydrostatic continuously variable transmissions $103_R$, $103_L$ increases, and the working vehicle 1 runs forward at a vehicle speed of 0 km/h to +7.5 km/h. When the right and left control arms $227_R$, $227_L$ are both moved backward from the neutral position, the rotating speed in the reverse rotating direction of the right and left hydrostatic continuously variable transmissions $103_R$, $103_L$ increases, and the working vehicle 1 runs backward at a vehicle speed of 0 km/h to −3.5 km/h. When the working vehicle 1 turns, a difference is caused in the moving angles of the right and left control arms $227_R$, $227_L$ from the neutral position, and the speed of the inner wheel of the driven wheels during turning becomes smaller than the speed of the outer wheel of the driven wheels during turning. As a result, along with turning of the front wheel Wf by operation of the steering wheel 8, the working vehicle 1 is turned. Or by driving only the outer wheel and stopping the driving of the inner wheel of the driven wheels during turning, the working vehicle 1 can make a stationary swing.

The relation between the operation of the steering wheel 8 and change lever 10 and the behavior of the working vehicle 1 is described below while referring to FIG. 18.

Figure 18:
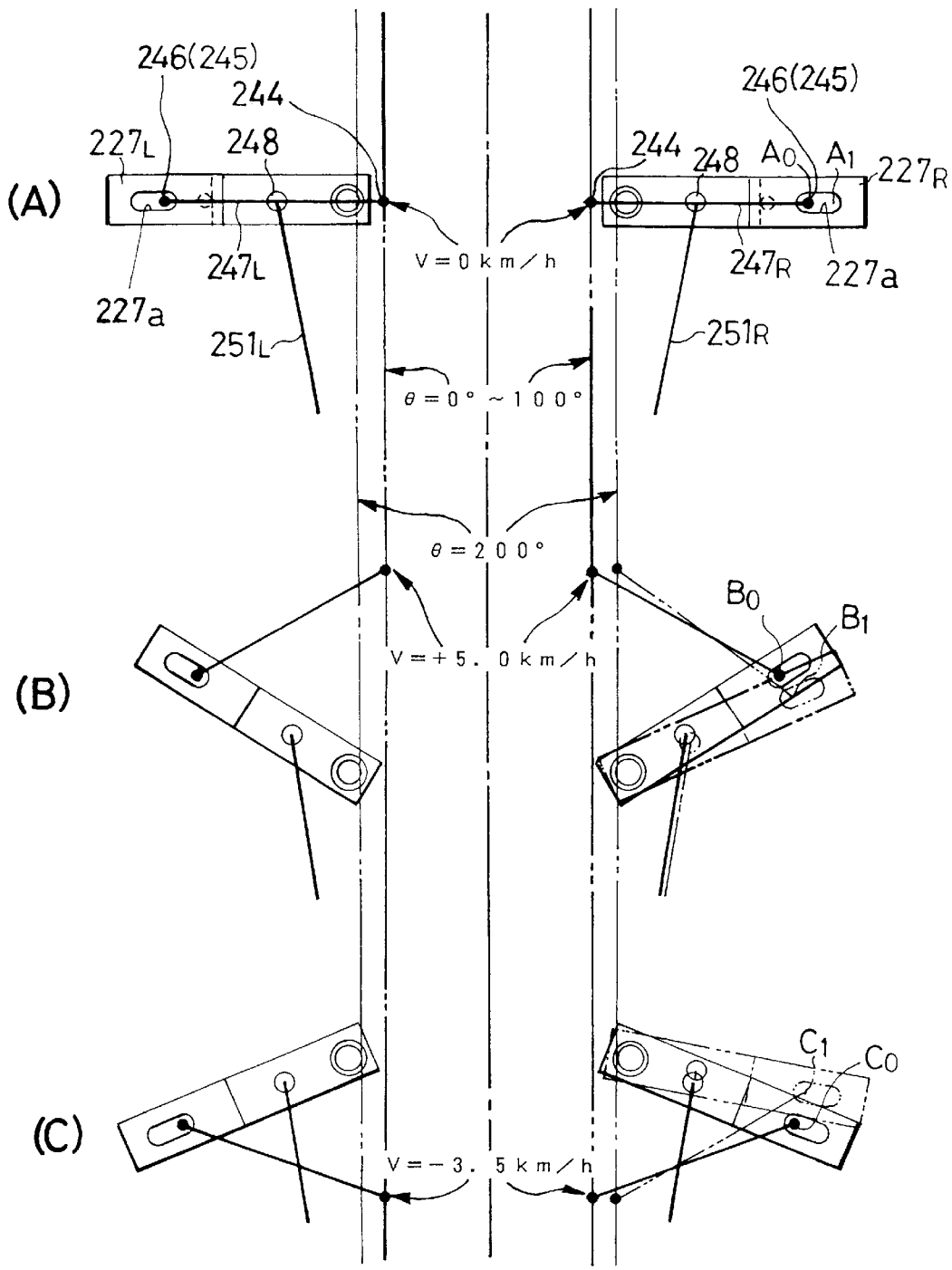

When the change lever 10 is at the neutral position, the working vehicle 1 is stopped, and at this time the right and left push-pull rods $247_R$, $247_L$ overlap on the right and left control arms $227_R$, $227_L$ extending straight in the lateral direction, and the pins 245, 245 of the outside ball joints 246, 246 provided at the front ends of the right and left push-pull rods $247_R$, $247_L$ are positioned at point $A_0$ at the inner end of the slots 227a, 227a of the right and left control arms $227_R$, $227_L$ (see FIG. 18 (A)).

At this time, when the steering wheel 8 is operated, for example, in left turning direction, the guide member 206 begins to oscillate to the right side around the pivots 205, 205. When the steering angle reaches 100°, the guide groove 206a of the guide member 206 abuts against the mixing lever 224, and the mixing lever 224 oscillates about the upper pivotal pin 225. As the mixing lever 224 oscillates in the right direction about the upper pivotal pin 225, the right second swing member $241_R$ begins to oscillate to the right side about the pin 242, resisting the neutral thrusting springs 243, 243. At this time, the left second swing member $241_L$ is held at its original position, abutting against the first swing member 221.

In this way, if the right second swing member $241_R$ is tilted to the right side and the right push-pull rod $247_R$ moves to the right direction, the outside ball joint 246 at its front end only slides within the slot 227a from point $A_0$ to point $A_1$ in FIG. 18 (A), so that the right control arm $227_R$ is held at the neutral position.

When the change lever 10 is moved forward from the neutral position in order to run forward the working vehicle 1, the rotary shaft 209 connected to the change lever 10 turns forward, and the right and left second swing members $241_R$, $241_L$ supported on this rotary shaft 209 also move forward. In consequence, the inside ball joints 244, 244 provided at the upper ends of the right and left second swing members $241_R$, $241_L$ move forward, and the outside ball joins 246, 246 connected to the inside ball joints 244, 244 through push-pull rods $247_R$, $247_L$ are pulled to the forward inner side.

As a result, the right and left control arms $227_R$, $227_L$ having the inner ends of slots 227a, 227a pulled by the pins 245, 245 of the outside ball joints 246, 246 are moved forward by an equal angle, resisting the neutral springs 231, 231 (see FIG. 18 (B)). In this way, when the right and left control arms $227_R$, $227_L$ are moved forward by the same extent, the working vehicle 1 runs forward at a vehicle speed (for example, +5.0 km/h) corresponding to the moving extent.

At this time, when the steering wheel 8 is operated, for example, in left turning direction in a steering angle range of θ=100° to 200°, the right push-pull rod $247_R$ moves to the right direction along with the oscillation of the second swing member $241_R$. Consequently, the outside ball joint 246 at the front end of the push-pull rod $247_R$ moves from point $B_0$ to point $B_1$ in FIG. 18 (B), and thereby the forward swing angle of the control arm $227_R$ decreases to the chain line position. Thus, the rotating speed of the motor shaft 121 of the right hydrostatic continuously variable transmission $103_R$ decreases, and the left rear wheel Wr slows down or stops, thereby making a smooth left turning.

When the change lever 10 is moved backward from the neutral position, the right and left control arms $227_R$, $227_L$ move backward symmetrically to the case of forward running, and the working vehicle 1 runs backward at a vehicle speed (for example, −3.5 km/h) corresponding to the reverse moving extent of the control arms $227_R$, $227_L$ (see FIG. 18 (C)).

In the case of reverse running, too, when the steering wheel 8 is operated in left turning direction in a steering angle range of θ=100° to 200°, the outside ball joint 246 moves from point $C_0$ to point $C_1$ in FIG. 18 (C), and the reverse swing angle of the right control arm $227_R$ decreases to the chain line position, and the rotating speed of the motor shaft 121 of the right hydrostatic continuously variable transmission $103_R$ decreases, and the left rear wheel Wr slows down or stops, thereby making a smooth left turning.

Herein is explained the case of operating the steering wheel 8 in the left turning direction, and it is substantially the same when the steering wheel 8 is operated in the right turning direction. Meanwhile, by varying the length of the slots 227a, 227a of the control arms $227_R$, $227_L$, the speed change characteristic in the case of operation of the steering wheel 8 can be easily adjusted.

As described so far, owing to the speed change operating device M of a simple structure with a high durability, the operation of steering wheel 8 and operation of change lever 10 can be mixed, and the transmission system T can be controlled. Moreover, when either steering wheel 8 or change lever 10 is operated, its operation does not interfere with the other, and the operation by the driver is simplified and the fatigue can be lessened.

In the case of a straight running of the working vehicle 1 by moving the change lever 10 either forward or backward, incidentally, a difference may be caused in the rotating speeds of the right and left rear wheels Wr due to a slight difference in characteristics of the right and left hydraulic motors 113, 113, or right and left hydraulic pumps 112, 112, and the route of the working vehicle 1 may be shifted to right or left in spite of the intention of the driver. In such a case, the turning tendency of the working vehicle 1 may be corrected in the following manner.

That is, the working vehicle 1 is allowed to run with the bolts 223, 223 loosened, and in order that the working vehicle 1 may run straight in this state, for example, the length of push-pull rods $251_R$, $251_L$ is adjusted finely. Then by tightening the bolts 223, 223 and fixing the first swing member 221 on the rotary shaft 209, thereafter the mixing lever 224 oscillates laterally about the upper pivotal pin 225.

Figure 19:
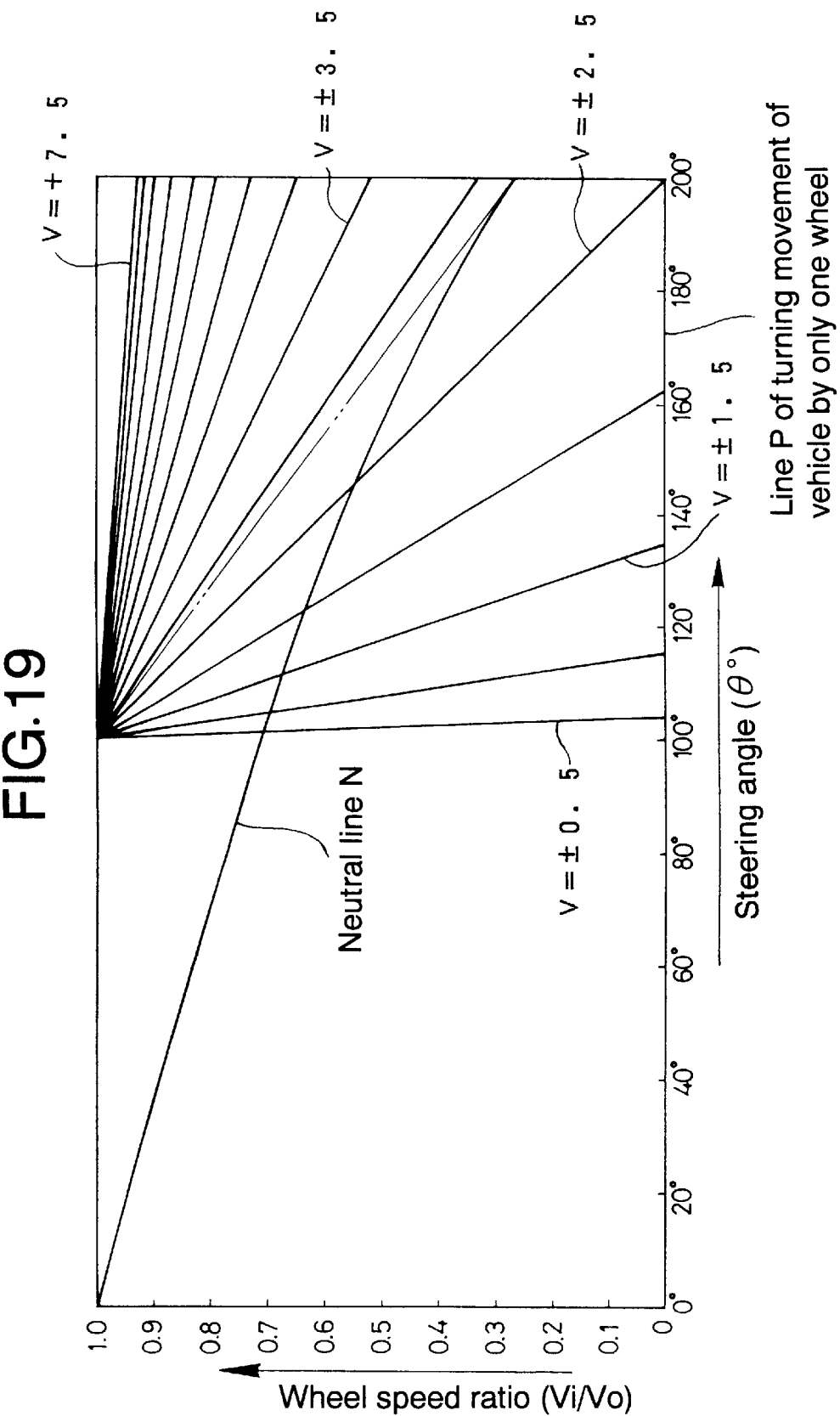
Figure 20:
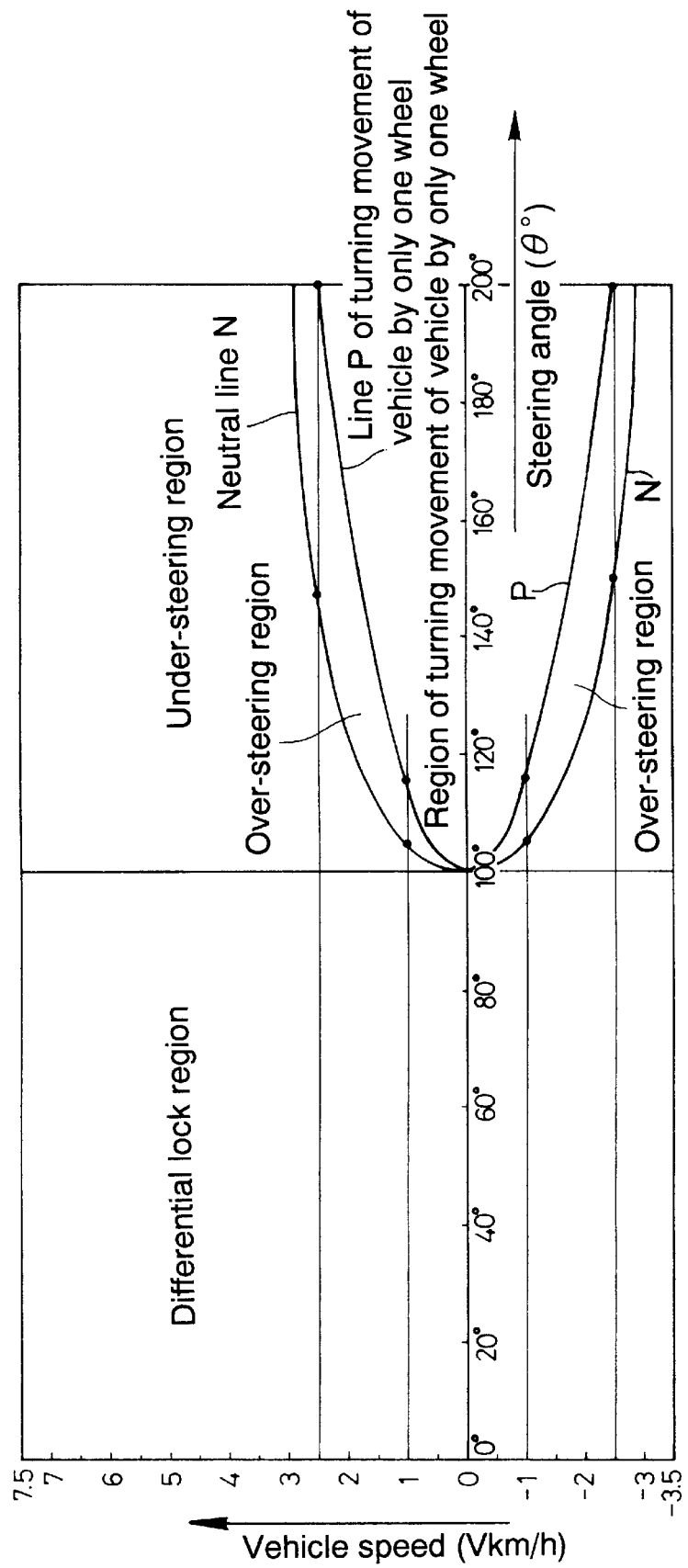

Referring then to FIGS. 19 and 20, changes in speed of inner and outer wheels of the driven wheels during turning are explained in detail in relation to the steering angle θ and vehicle speed V.

In the steering angle region of θ=0° to 100°, the wheel speed ratio Vi/Vo of the speed Vi of the inner wheel to the speed Vo of the outer wheel of the driven wheels during turning is always set at 1.0 regardless of the vehicle speed. As a result, in the steering angle region of θ=0° to 100°, the outer wheel speed Vo and the inner wheel speed Vi are matched to be set in a differential lock state, so that the straight running stability at a small steering angle is enhanced. When the steering angle exceeds θ=100°, the wheel speed ratio Vi/Vo becomes smaller than 1.0, and the inner wheel speed Vi decreases gradually while the outer wheel speed Vo remains constant, thereby changing to under-steering state, neutral steering state, over-steering state, or turning state by only one driven wheel.

The steering angle at which the wheel speed ratio Vi/Vo becomes smaller than 1.0 is not limited to θ=100°, and it may be properly changed in a range of 60° to 120°.

In FIG. 19, when the vehicle speed V is relatively low (that is, at vehicle speed of V=0 km/h to ±2.5 km/h), by exceeding the steering angle θ=100°, the wheel speed ratio Vi/Vo decreases relatively suddenly from 1.0, and finally intersects with the line P of turning movement of the vehicle by only one wheel, having the wheel speed ratio Vi/Vo =0, while crossing the neutral steering line N midway.

The neutral steering line N is to give the wheel speed ratio Vi/Vo for providing a neutral steering state at each steering angle θ. The value of wheel speed ratio Vi/Vo on the neutral steering line N is determined by Vi/Vo=Li/Lo, supposing the distance from the center of turning determined by the steering angle θ to the outer wheel of the driven wheels during turning to be Lo, and the distance to the inner wheel to be Li.

Therefore, in FIG. 20, assuming a case of, for example, vehicle speed V=±1.0 km/h, in the differential lock region of steering angle θ=0° to 100°, the wheel speed ratio Vi/Vo becomes 1.0, and the outer wheel speed Vo and inner wheel speed Vi are matched to be set in a virtual differential lock state. In the under-steering region of steering angle θ=100° to 105°, the wheel speed ratio Vi/Vo<1.0, and the inner wheel speed Vi decreases gradually, but still the under-steering state is maintained. Reaching a condition of the steering angle θ=1050, intersecting with the neutral steering line N, it falls in neutral steering state. In an over-steering region with the steering angle θ=105° to 115°, the vehicle speed Vi/Vo further decreases to be set in over-steering state, and after intersecting with the line P of turning movement of vehicle by only one driven wheel, at steering angle θ=115°, the wheel speed ratio Vi/Vo becomes 0, thereby realizing the turning state of the vehicle by only one driven wheel, with the inner wheel speed Vi=0.

In the case of vehicle speed V=±2.5 km/h, passing through the differential lock region of steering angle θ=0° to 100° and under-steering region of steering angle 0=100° to 147°, intersecting with the neutral steering line N at steering angle θ=147°, it falls in neutral steering state, and further after passing the over-steering region at steering angle 0=147° to 200°, it falls in the turning state of the vehicle by only one driven wheel, intersecting with the line P of turning movement of the vehicle by only one driven wheel at steering angle θ=200°.

In the case of vehicle speed V=±2.5 km/h to ±2.9 km/h (not including V=±2.5 km/h), the state changes to the differential lock region, under-steering region, neutral steering region, and over-steering region, depending on the increase of steering angle θ, but never falling in the state of turning movement of the vehicle by only one driven wheel. When the vehicle speed V exceeds ±2.9 km/h, depending on the increase of steering angle θ, the differential lock region is changed to an under-steering region, but never changing to a neutral steering region, an over-steering region, or a region of turning movement of the vehicle by only one driven wheel.

As described herein, in the range of vehicle speed V=0 km/h to ±2.5 km/h, along with the increase in steering angle θ, the state changes over from differential lock region to under-steering region, neutral steering region, the over-steering region and then to the region of turning movement of the vehicle by only one driven wheel. In the range of vehicle speed V=±2.5 km/h to ±2.9 km/h (not including V=±2.5 km/h), along with the increase in steering angle θ, the differential lock state is changed to under-steering state, neutral steering state and then to over-steering state. In the range of vehicle speed V=+2.9 km/h to +7.5 km/h and in the range of vehicle speed of V=−2.9 km/h to −3.5 km/h, along with the increase in steering angle θ, the differential lock state is changed to the under-steering state.

Thus, at a low traveling speed where the vehicle body stability is high, the turning performance is enhanced by setting the vehicle in the over-steering state or the state of turning movement by only one driven wheel, at a relatively small steering angle θ, and at a high traveling speed where the vehicle body stability is low, the vehicle body stability may be sufficiently maintained by making the over-steering state or the state of turning movement by only one driven wheel non-usable.

A second embodiment of the invention is described below while referring to FIGS. 21 to 27.

Figure 21:
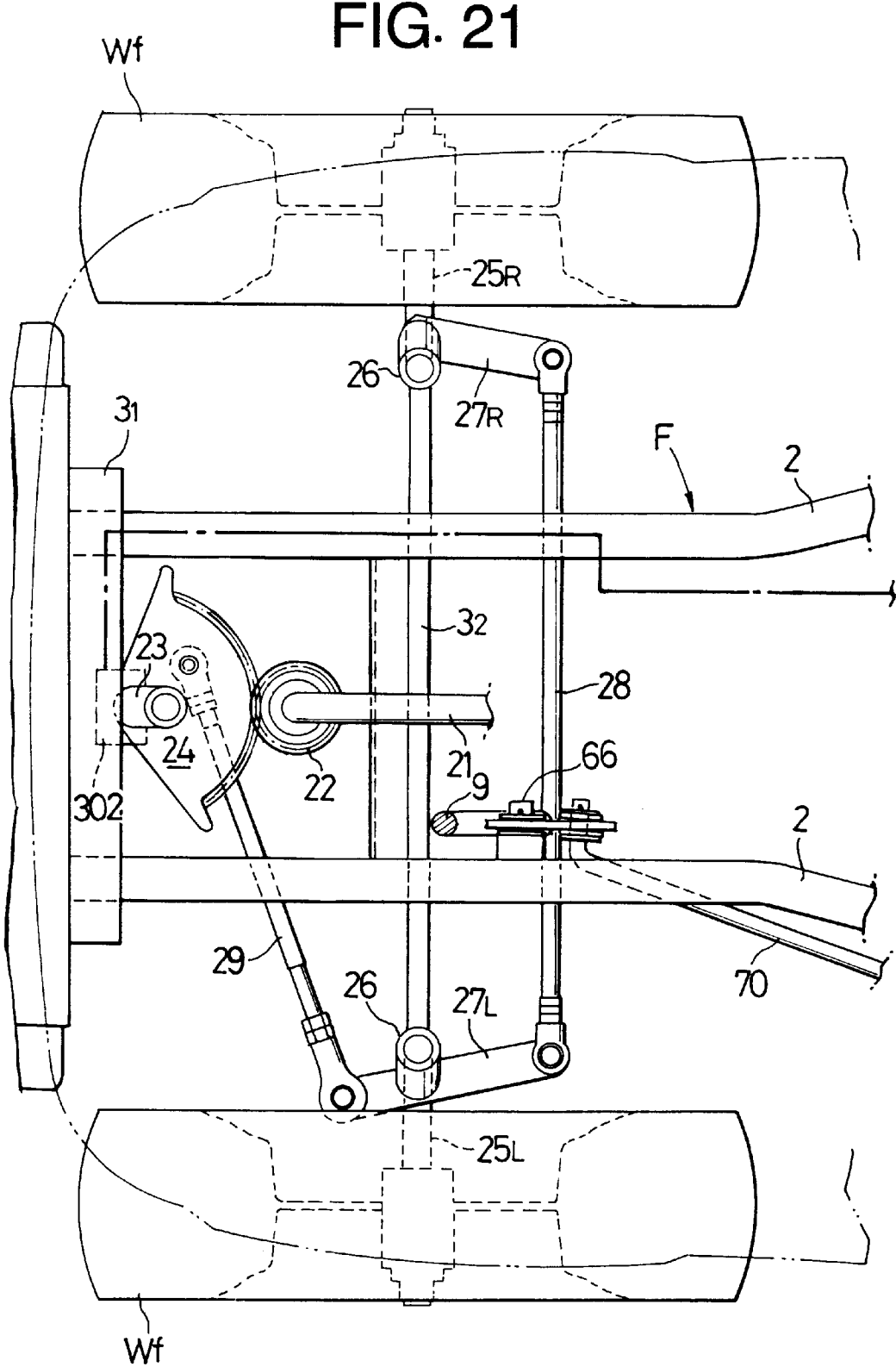
Figure 22:
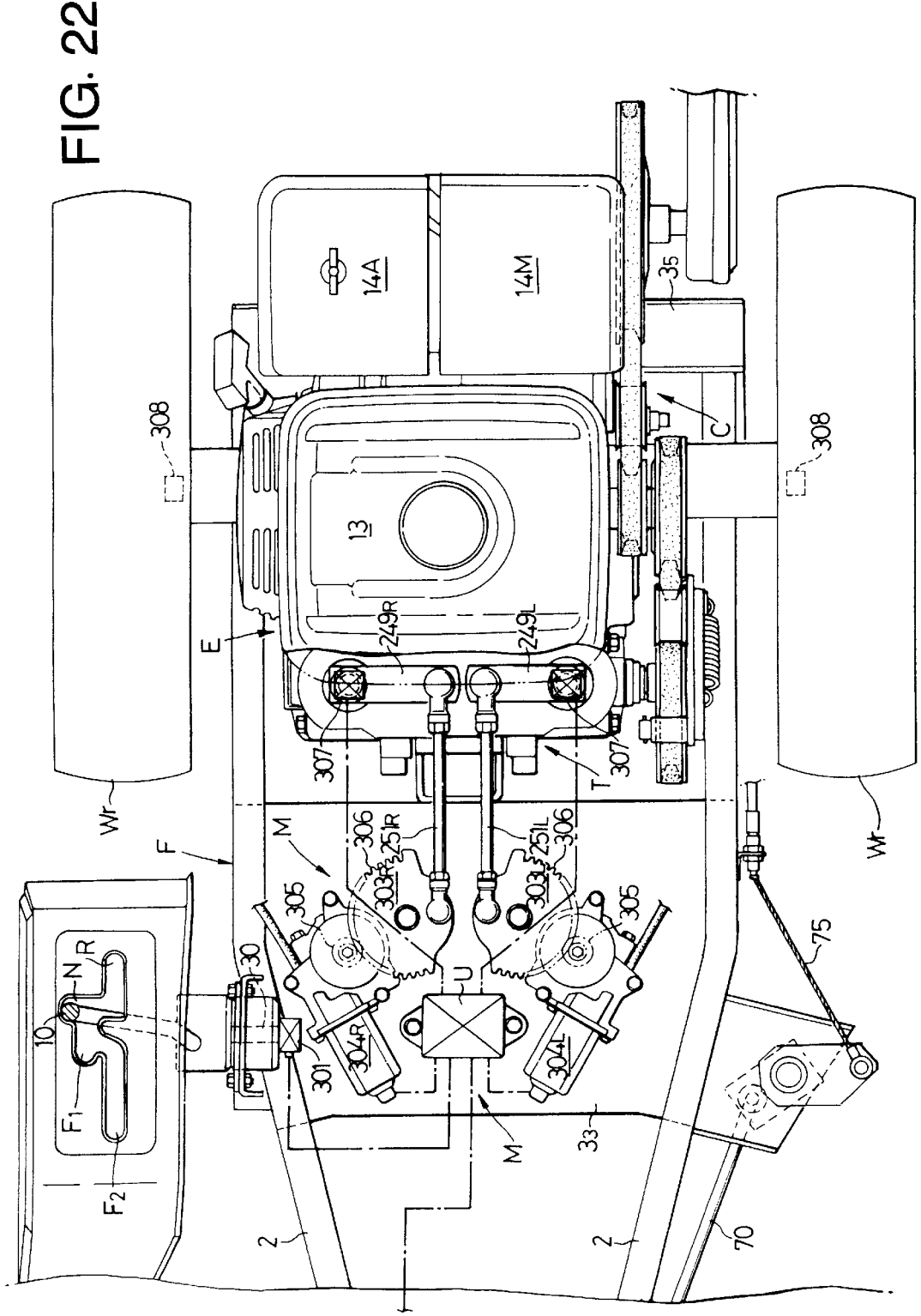

The second embodiment is intended to control the transmission system T electrically by the speed change operating device M installed beneath the seat 7. As shown in FIGS. 21 and 22, an electronic control unit U having a microcomputer receives a signal from a first sensor 301 for detecting the operating stroke of the change lever 10, and a signal from a second sensor 302 for detecting the operating stroke of the steering wheel 8 on the basis of the rotation of a sector gear 24. Speed change plates $303_R$, $303_L$ (speed change control members) connected to a pair of right and left speed change arms $249_R$, $249_L$ of the transmission system T through push-pull rods $251_R$, $251_L$ are rotated and driven by a pair of right and left motors $304_R$, $304_L$ each equipped with a speed reduction device and connected to the electronic control unit U through gears 305, 305 and sector gears 306, 306. Signals from a pair of right and left third sensors 307, 307 for detecting the swing angle of the speed change arms $249_R$, $249_L$ are fed into the electronic control unit U.

The electronic control unit U calculates the command angles of the right and left speed change arms $249_R$, $249_L$ on the basis of the signals from the first sensor 301 and second sensor 302, and controls, by feedback, the rotation of the motors $304_R$, $304_L$ equipped with a speed reduction device so that the actual angles of the right and left speed change arms $249_R$, $249_L$ produced by the third sensors 307, 307 may coincide with the command angles.

Figure 23:
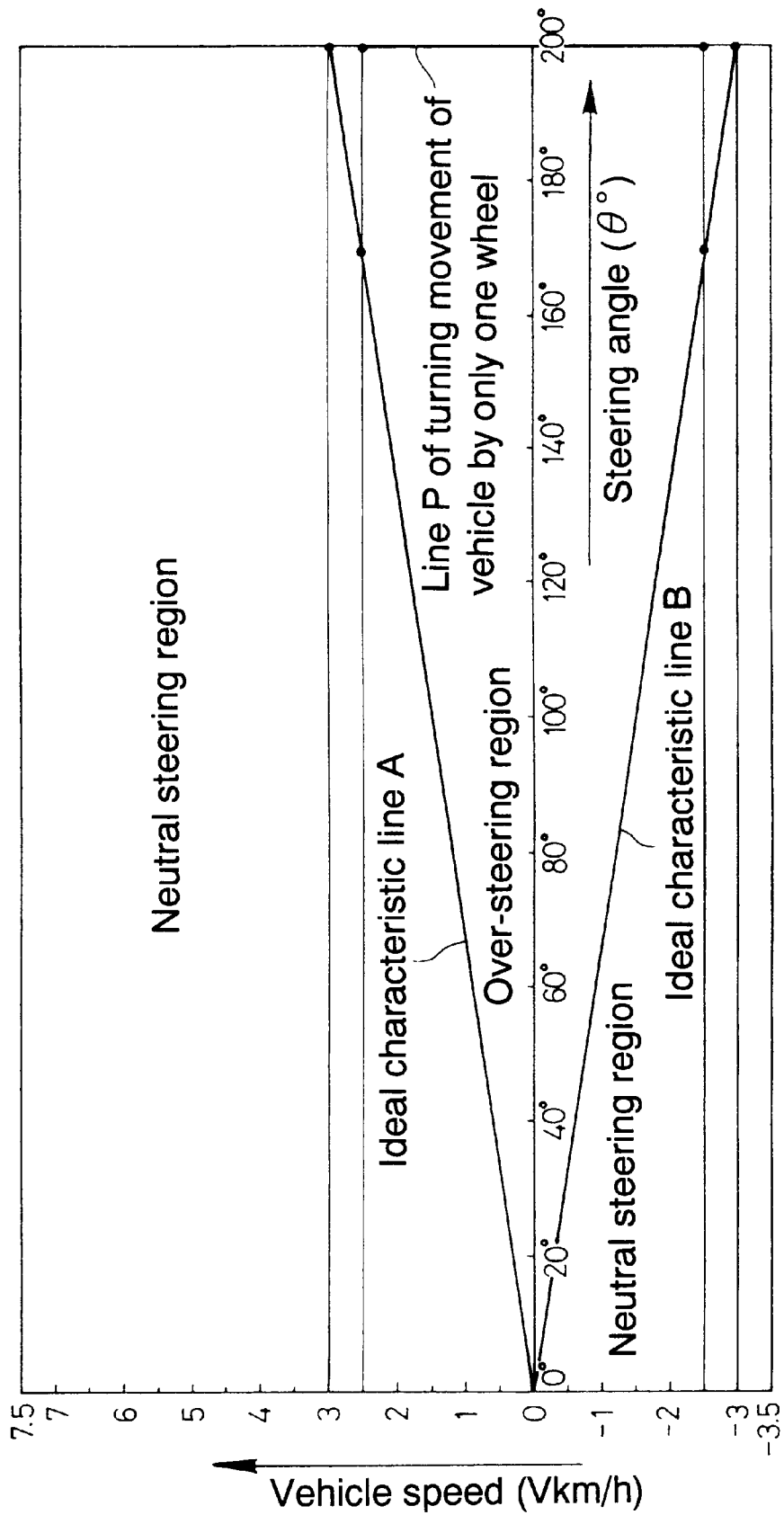

FIG. 23 is a graph showing an ideal steering characteristic. In the graph, the axis of ordinates denotes the vehicle speed V (forward 0 km/h to +7.5 km/h, reverse 0 km/h to −3.5 km/h), and the axis of abscissas represents the steering angle θ (0° at left to 200° at right), and the upper region of an ideal characteristic line A and the lower region of an ideal characteristic line B are the neutral steering regions, and the region enclosed by both lines A and B is the over-steering region. That is, in either of forward or reverse run, in the state of vehicle speed V being less than 3.0 km/h, at a low speed where the vehicle body stability is high, the turning performance can be enhanced by placing the vehicle in an over-steering state already from a small steering angle θ, and at a high speed where the vehicle body stability is low, the vehicle body behavior can be stabilized by changing from the large steering angle θ to over-steering state. In the state of vehicle speed V exceeding ±3.0 km/h, the vehicle always assumes the neutral steering state regardless of the steering angle θ.

When the vehicle speed V stays in a range of ±2.5 km/h, at the steering angle θ=200°, the speed of inner wheel of the driven wheels during turning becomes 0 km/h to make the vehicle turn by only one driven wheel. When the vehicle speed V exceeds ±2.5 km/h, even at the steering angle θ=200°, a turning movement of the vehicle by only one driven wheel is not available.

The control of speeds of inner and outer wheels of the driven wheels during turning for obtaining the characteristic of FIG. 23 is explained below.

Figure 24:
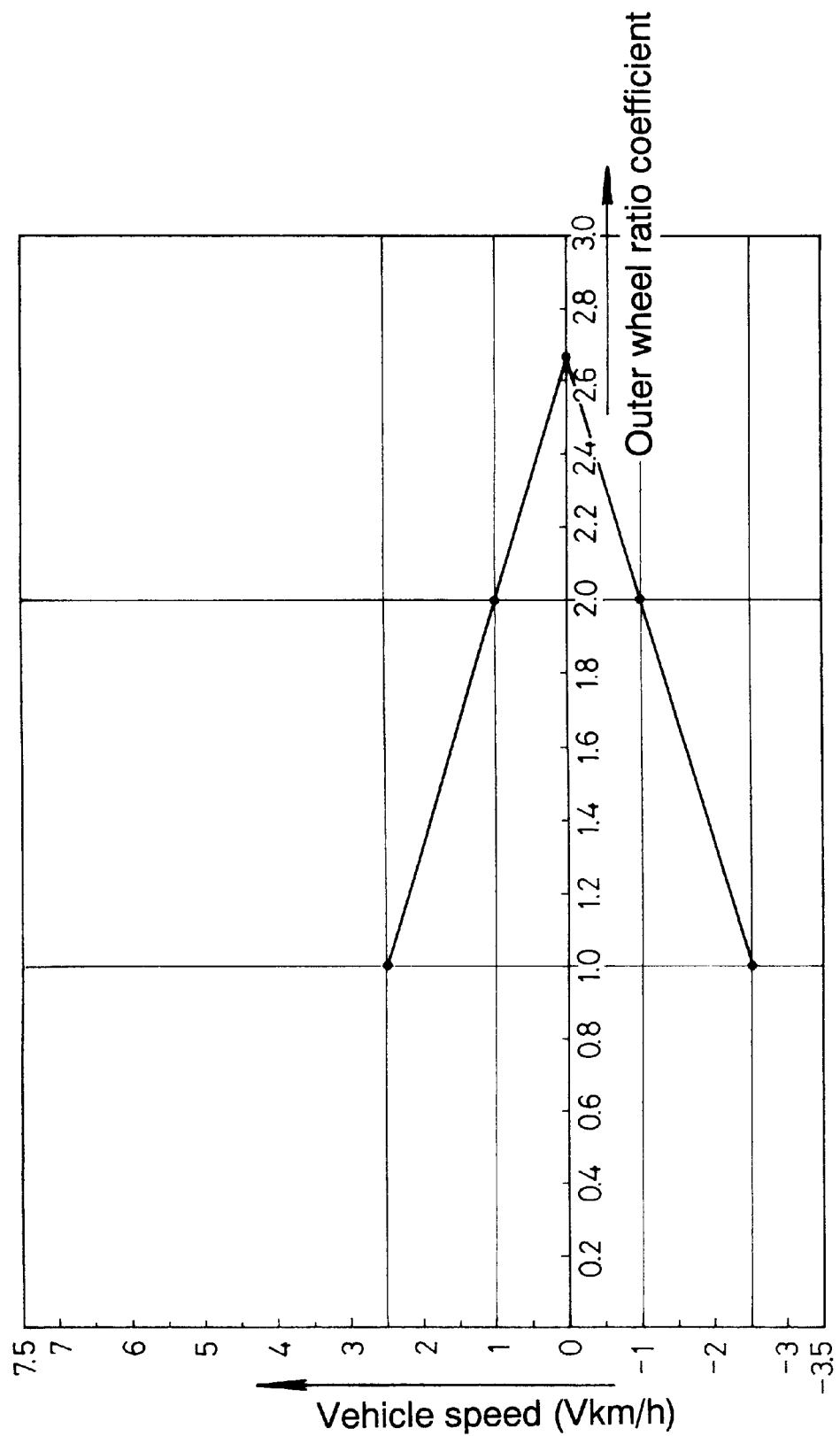

FIG. 24 shows the outer wheel ratio coefficient at various vehicle speeds V for determining the speed Vo of outer wheel of the driven wheels during turning when the vehicle turns by only one driven wheel. The outer wheel ratio coefficient changes linearly from 2.65 at vehicle speed V=0 km/h to 1.0 at V=±2.5 km/h, and by multiplying this outer wheel ratio coefficient by the vehicle speed V, the speed of outer wheel of the driven wheels during turning permitting the vehicle to turn by only one driven wheel is obtained. The speed of the inner wheel for turning movement of the vehicle by only one driven wheel is, of course, 0 km/h.

Figure 25:
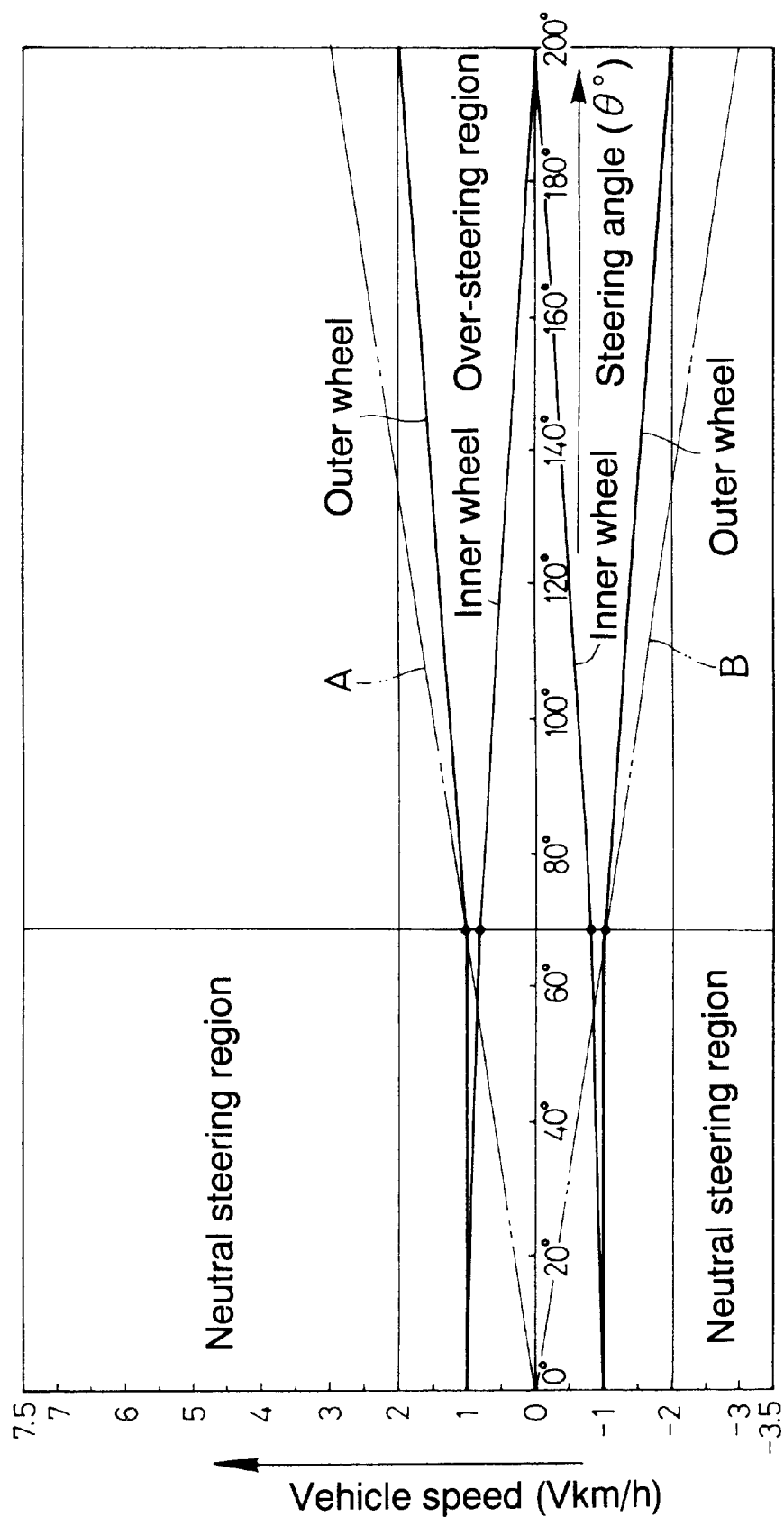

FIG. 25 is a graph showing the outer wheel speed Vo and inner wheel speed Vi during turning at vehicle speed V=±1.0 km/h. In the neutral steering region at the upper side of the ideal characteristic line A, the outer wheel speed Vo is kept at a predetermined value of ±1.0 km/h same as vehicle speed V. On the other hand, from the steering angle θ=0° to steering angle θ=67° where the line of the vehicle speed V=±1.0 km/h intersects with the ideal characteristic line A, the inner wheel speed Vi decreases gradually from ±1 km/h in order to maintain the neutral steering state. This inner wheel speed Vi is determined by multiplying the outer wheel speed Vo by the ratio Vi/Vo on the neutral line N in FIG. 19.

In a state exceeding the steering angle θ=67°, the inner wheel speed Vi decreases linearly, and becomes 0 km/h at steering angle θ=200°. On the other hand, in the state exceeding the steering angle θ=67°, the outer wheel speed Vo increases linearly. Upon reaching the steering angle 0=200°, the outer wheel speed Vo is determined on the basis of the outer wheel ratio coefficient given in the graph in FIG. 24. That is, the outer wheel ratio coefficient at the vehicle speed V=±1.0 km/h is 2.0 so that the outer wheel speed Vo when the steering angle θ reaches 200° is 2.0 times the vehicle speed V=±1.0 km/h, that is, ±2.0 km/h.

When the vehicle speed V=±1.0 km/h, the neutral steering state continues up to the steering angle θ=67°, and when the steering angle θ exceeds 67°, the over-steering state is established, and the turning movement of the vehicle by only one driven wheel is realized at steering angle θ=200°.

Figure 26:
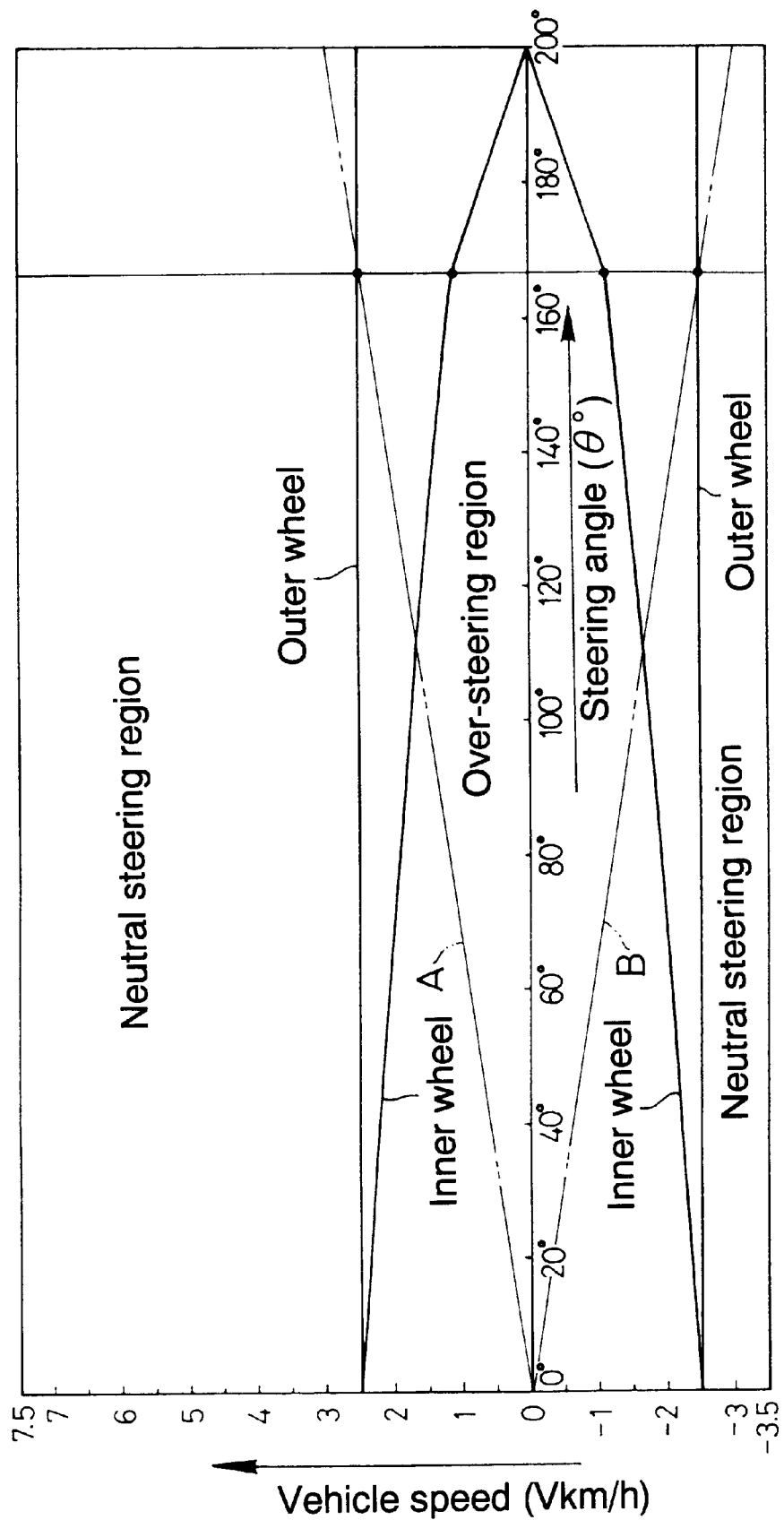

FIG. 26 is a graph showing the outer wheel speed Vo and inner wheel speed Vi during turning at vehicle speed V=±2.5 km/h. In the neutral steering region up to steering angle θ=167°, the outer wheel speed Vo is kept at ±2.5 km/h which is the same as the vehicle speed V, while the inner wheel speed Vi gradually decreases from ±2.5 km/h. When the steering angle θ exceeds 167°, the inner wheel speed Vi decreases linearly, until the speed Vi reaches 0 km/h which is obtained at the steering angle 0=200°. On the other hand, as clear from FIG. 24, since the outer wheel ratio coefficient is 1.0 at the vehicle speed of V=±2.5 km/h, the outer wheel speed Vo when reaching the steering angle θ=200° is 1.0 times the vehicle speed V=±2.5 km/h, that is, ±2.5 km/h. Therefore, at the vehicle speed V=±2.5 km/h, the outer wheel speed Vo is kept at Vo=±2.5 km/h over the entire region of steering angle θ=0° to 200°.

Thus, in the range of vehicle speed V=0 km/h to ±2.5 km/h, when the steering angle θ exceeds a specific angle, the neutral steering state is changed to the over steering state, and the vehicle can turn by only one driven wheel when reaching the steering angle θ=200°. The steering angle θ for changing from the neutral steering state to the over-steering state is smaller in low speed running and larger in high speed running.

Figure 27:
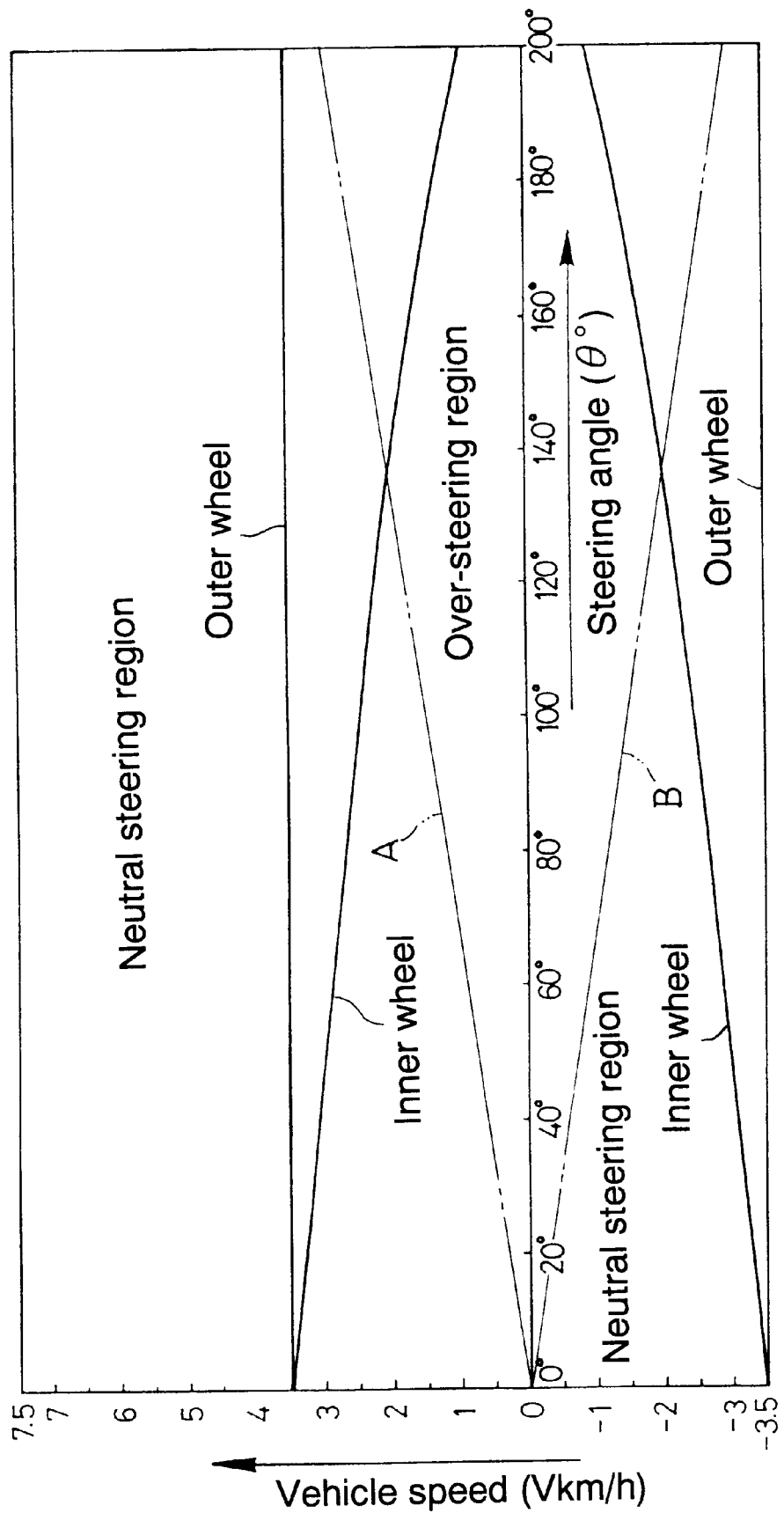

FIG. 27 is a graph showing the outer wheel speed Vo and inner wheel speed Vi during turning at vehicle speed V=±3.5 km/h. In this case, the entire region of steering angle θ=0° to 200° is the neutral steering region, and the outer wheel speed Vo is kept at ±3.5 km/h the same as the vehicle speed V, and the inner wheel speed Vi decreases gradually from ±3.5 km/h according to the characteristic of the neutral line N shown in FIG. 19. Thus, by holding the neutral steering state at high speed, the straight running stability is enhanced.

The neutral state is always maintained in a range of vehicle speed of V=+3.0 km/h to +7.5 km/h in forward running, and in a range of vehicle speed of V=−3.0 km/h to −3.5 km/h in reverse running.

Thus, according to the second embodiment of electrically controlling the transmission system T, the ideal steering characteristic shown in FIG. 23 can be easily realized, and its characteristic may be easily changed.

In the second embodiment, too, the speed change operating device M disposed beneath the seat 7 and the transmission system T disposed adjacently behind the device M are connected through a pair of push-pull rods $251_R$, $251_L$ extending in the longitudinal direction of the vehicle body, and therefore not only the balance is improved in the lateral direction of the vehicle body, but also the length of the push-pull rods $251_R$, $251_L$ is shortened, and formation of deflection or backlash may be prevented.

In the second embodiment, the vehicle speed is detected indirectly on the basis of the output of the first sensor 301 which detects the operating stroke of the change lever 10, but the vehicle speed may be detected directly, for example, by rotating speed sensors 308, 308 (see FIG. 22) attached to axles $106_R$, $106_L$.

Some embodiments of the invention have been described herein, but the invention is not limited to the illustrated embodiments alone, and various design changes are possible.

For example, instead of the four-wheel vehicle shown in the embodiments, the invention may be also applied to a three-wheel vehicle with one front wheel, a vehicle with front wheels and rear right and left crawlers, or a vehicle having right and left crawlers only without wheels. In the vehicle with crawlers, the driven wheel speed in the invention corresponds to the speed of a driven wheel for driving the crawlers. In the vehicle with front wheels, the front wheels may be caster type wheels that are not steered.

In the embodiments, as the steering angle setting means, the circular steering wheel with a large angle of rotation is used, but it may be replaced by a handle bar with a small angle of rotation.

The embodiments relates to two-pump and two-motor transmission, but the invention may be also applied to one-pump and two-motor transmission. Besides, in the case of two-pump and two-motor transmission, instead of controlling the motor swash plate of the hydraulic motor, the pump swash plate of the hydraulic pump may be controlled.

Instead of the hydrostatic continuously variable transmissions $103_R$, $103_L$ used in the embodiments, the continuously variable transmissions may be also any other types, including a belt type continuously variable transmission, cone type continuously variable transmission, and friction type continuously variable transmission.

What is claimed is:

1. An operating device in a vehicle provided with front and rear wheels, a steering device and a pair of continuously variable transmissions, the vehicle comprising:

left and right driven wheels as the front or rear wheels connected to said pair of continuously variable transmissions, respectively;

a vehicle speed setting means for setting a vehicle speed; and a steering angle setting means for setting a steering angle of the steering device which is operatively associated with the other of said front and rear wheels; in which outputs of said continuously variable transmissions are increased and decreased at substantially identical rotational numbers to each other based on an operation of said vehicle speed setting means, and said outputs of said continuously variable transmissions are increased and decreased at different rotational numbers from each other based on an operation of said steering angle setting means, thereby varying wheel speeds of the driven wheels so as to control said vehicle speed and to conduct a steering, wherein said operating device includes a steering characteristic changeover means for changing over speed increasing and decreasing characteristics of said pair of continuously variable transmissions based on the operation of said steering angle setting means in accordance with the vehicle speed, said steering characteristic changeover means comprising a pair of first speed change operating members which are pivotally supported, through a longitudinal shaft, on a lateral shaft operatively associated with the operation of said vehicle speed setting means for longitudinal swinging movement, and which are capable of longitudinally swinging integrally with said lateral shaft and capable of laterally swinging about said longitudinal shaft; a second speed change operating member operatively associated with the operation of said steering angle setting means for laterally swinging movement; and a mixing member which transmits a lateral swinging movement of said second speed change operating member to said first speed change operating members for laterally swinging said first speed change operating members, and which restrains a longitudinal swinging movement of said first speed change operating members from being transmitted to said second speed change operating member.

2. An operating device according to claim 1, wherein in accordance with an increase in the steering angle, a deviation between the wheel speeds of the driven wheels increases and the wheel speed of one of the driven wheels which is on an inner side during turning of the vehicle decreases.

3. An operating device according to claim 1, wherein the wheel speeds of the driven wheels are held in a neutral steering state over an entire range of the steering angle when the vehicle speed exceeds a predetermined value.

4. An operating device according to claim 1, wherein an operating region is provided in which when the vehicle speed is equal to or lower than a predetermined value, the rotation of an inner wheel of the driven wheels during turning of the vehicle is stopped in accordance with an increase in the steering angle and the vehicle is turned only by an outer wheel of the driven wheels.

5. An operating device according to claim 1, wherein a deviation between the wheel speeds of the driven wheels is set to a first value when the vehicle travels at a first speed, whereas said deviation is set to a second value larger than said first value when the vehicle travels at a second speed that is lower than said first speed.

6. An operating device according to claim 1, wherein when the vehicle speed is equal to or lower than a predetermined value, if the steering angle exceeds a predetermined value, the wheel speeds of the driven wheels are brought into an over-steering state, and in the over-steering state, during turning of the vehicle, the wheel speed of an outer wheel of the driven wheels increases and the wheel speed of an inner wheel of the driven wheels decreases.

7. An operating device according to claim 1, wherein the wheel speeds of the driven wheels are set to substantially identical values when the steering angle is equal to or lower than a predetermined value.

8. An operating device according to claim 1, wherein a neutral steering point is provided in which the wheel speeds of the driven wheels are brought into a neutral steering state within a range of the steering angle exceeding a predetermined value when the vehicle speed is equal to or lower than a predetermined value.

9. An operating device according to claim 1, wherein the vehicle further includes a seat disposed substantially at a central portion of a vehicle body, a working machine disposed at a rear portion of the vehicle body for up and down movements, an engine disposed between said seat and said working machine, and a muffler mounted on the engine, wherein an upper end of the working machine when lifted to a highest position is set lower than an upper end of the muffler.

10. An operating device in a vehicle provided with a pair of continuously variable transmissions, comprising: a transmission system including said pair of continuously variable transmissions for changing rotational numbers of left and right driven wheels; a pair of speed change follower members provided in said transmission system; a vehicle speed setting means; and a speed change operating device for driving said speed change follower members at an identical phase based on an operation of said vehicle speed setting means, and for driving said speed change follower members at different phases based on an operation of said steering angle setting means; wherein said speed change operating device comprises: a pair of speed change driving members connected to said pair of speed change follower members; a pair of first speed change operating members which are pivotally supported, through a longitudinal shaft, on a lateral shaft operatively associated with the operation of said vehicle speed setting means for longitudinal swinging movement, and which are capable of longitudinally swinging integrally with said lateral shaft and capable of laterally swinging about said longitudinal shaft; a link member for connecting said pair of first speed change operating members to said pair of speed change driving members; a second speed change operating member operatively associated with the operation of said steering angle setting means for laterally swinging movement; and a mixing member which transmits a lateral swinging movement of said second speed change operating member to said first speed change operating members for laterally swinging said first speed change operating members, and which restrains a longitudinal swinging movement of said first speed change operating members from being transmitted to said second speed change operating member.

11. An operating device according to claim 10, wherein said mixing member is fitted to a guide groove formed longitudinally in said second speed change operating member and is longitudinally swung integrally with said lateral shaft, and is also laterally swung following a lateral swinging movement of said second speed change operating member.

12. An operating device according to claim 11, wherein said pair of first speed change operating members are biased toward a neutral position abutting against said mixing member, and only one of said first speed change operating members which is pressed by said mixing member swings laterally following a lateral swinging movement of said mixing member.

13. An operating device in a vehicle provided with a pair of continuously variable transmissions, comprising; a transmission system including said pair of continuously variable transmissions; a speed change operating device for controlling speed change characteristics of said continuously variable transmissions; a speed change control member provided in said speed change operating device; and another speed change control member provided in said transmission system, said speed change control members being connected together by a link member; said transmission system and said speed change operating device being mounted to a vehicle frame; wherein said speed change operating device is disposed in a lower portion of a seat provided at a substantially central portion of a vehicle body in both longitudinal and lateral directions, said transmission system is disposed in a rear of said speed change operating device at a position substantially centrally in the a lateral direction of said vehicle body, and said link member is disposed substantially along the longitudinal direction of said vehicle body.

* * * * *